US007048575B2

(12) United States Patent
Kidman

(10) Patent No.: US 7,048,575 B2
(45) Date of Patent: May 23, 2006

(54) PANEL-MOUNTED, LOW VOLTAGE TERMINAL

(75) Inventor: Brent L. Kidman, Spanish Fork, UT (US)

(73) Assignee: Quixemble, Inc., Salt Lake City, UT (US)

( * ) Notice: Subject to any disclaimer, the term of this patent is extended or adjusted under 35 U.S.C. 154(b) by 0 days.

(21) Appl. No.: 10/843,870

(22) Filed: May 12, 2004

(65) Prior Publication Data
US 2005/0007750 A1 Jan. 13, 2005

Related U.S. Application Data

(60) Provisional application No. 60/469,727, filed on May 12, 2003.

(51) Int. Cl.
H01R 13/66 (2006.01)
H01R 13/60 (2006.01)

(52) U.S. Cl. .......................... 439/538; 174/53; 200/3.6
(58) Field of Classification Search ................ 439/538, 439/535, 536; 174/53, 56, 58; 200/3.6
See application file for complete search history.

(56) References Cited

U.S. PATENT DOCUMENTS

| 4,408,696 | A | * | 10/1983 | Crosson | 220/3.6 |
| 5,064,386 | A | * | 11/1991 | Dale et al. | 439/535 |
| 5,223,673 | A | * | 6/1993 | Mason | 174/53 |
| 6,093,890 | A | | 7/2000 | Gretz | |
| 6,229,087 | B1 | | 5/2001 | Archer | |
| 6,347,959 | B1 | * | 2/2002 | Sawayanagi | 439/537 |
| 6,452,813 | B1 | | 9/2002 | Gretz | |
| 6,609,927 | B1 | * | 8/2003 | Kidman | 439/538 |
| 6,624,355 | B1 | | 9/2003 | Gretz | |
| 6,679,725 | B1 | * | 1/2004 | Kidman | 439/536 |
| 6,814,611 | B1 | * | 11/2004 | Torres | 439/535 |
| 6,840,800 | B1 | * | 1/2005 | Kidman | 439/535 |
| 2003/0109173 | A1 | | 6/2003 | Kidman | |
| 2004/0242061 | A1 | * | 12/2004 | Gledhill et al. | 439/535 |

* cited by examiner

Primary Examiner—Chandrika Prasad
(74) Attorney, Agent, or Firm—Pate Pierce & Baird

(57) ABSTRACT

An assembly for securing low voltage terminals. The assembly may include a panel forming a wall covering. The panel may have an exterior surface, an interior surface, and an aperture extending therethrough. A base may abut the exterior surface of the panel proximate the aperture. The base may include one or more receivers. One or more securements may each include a retainer and slide. The retainers may abut the interior surface of the panel. The slides may extend from the retainers, pass through the aperture, and unidirectionally engage the receivers to maintain the base in abutment with the exterior surface of the panel.

28 Claims, 18 Drawing Sheets

PANEL-MOUNTED, LOW VOLTAGE TERMINAL

RELATED APPLICATIONS

This application claims the benefit of U.S. Provisional Patent Application Ser. No. 60/469,727, filed on May 12, 2003 for QUICK ASSEMBLING, LOW VOLTAGE TERMINAL.

BACKGROUND

1. The Field of the Invention

This invention relates to electrical fixture anchoring and, more particularly, to novel systems and methods for facilitating low voltage terminal assembly.

2. The Background Art

Manually installing screws or other fasteners is often time consuming. Additionally, in certain installations, the installer must employ his or her hands to hold several components as well as rotate a tool transferring rotation to a screw or other type of fastener. Maintaining all of the components in proper alignment is often difficult and requires skill. In any case, the complexity slows the installation process.

Power tools may simplify the installation process by providing the motion (e.g. rotation) necessary to advance or install a fastener. The power tool must, however, be held and positioned in a manner similar to a manual tool. Thus, the use of power tools may not significantly lessen the demands on the installer.

A low voltage terminal assembly is one example of a time consuming fastener installation. Typical low voltage mounting brackets or bases require the rotation of a screw to advance a clamp to the point where it grips a wall panel. This rotation is time consuming and even alignment of a power tool takes significant time and care to not damage parts. Moreover, once the mounting bracket is in place, more screws are typically required to secure the face plate and fixture to the mounting bracket.

Often it is difficult to initiate engagement between screws and their corresponding receiving holes. Such difficulty typically arises because the receiving hole may be misaligned, obscured by the wall paneling, or recessed into the wall. Once the screw is in engagement with the receiving hole, the time-consuming and often laborious task of advancing the finely threaded screw remains. Moreover, face plate screws and other securement devices may be considered unsightly. Screws used to secure face plates are typically painted and are, therefore, exposed to chipping, tarnishing, wear, and oxidation.

What is needed is a quick assembling, low voltage terminal that provides a strong and reliable securement between the mounting bracket and wall and between the mounting bracket and the face plate. Such an assembly should significantly reduce the time, skill level, and effort required to assemble and complete low voltage terminal installation.

BRIEF SUMMARY OF THE INVENTION

A low voltage terminal assembly in accordance with the present invention may be arranged to secure to a panel itself, rather than to a stud or other support member. In certain embodiments, an aperture may be formed in a panel. A base may abut the panel proximate the aperture. One or more securements may engage the base to sandwich the panel between the base and the securement. An interface may provide the structure for connecting a face plate to the base. The face plate may secure the fixture.

A base in accordance with the present invention may have any suitable shape. In general, the aperture may be formed to match the shape of the base. In selected embodiments, a base may be shaped to frame (i.e. form a border around) the aperture. A base may also include one or more receivers. Selected receivers may be shaped and positioned to receive and engage securements, while other receivers may be shaped and positioned to secure the interface. A base may be arranged to secure face plates that are single gang, double gang, triple gang, quadruple gang, quintuple gang, or the like.

An interface in accordance with the present invention may be any structure connecting a face plate to a base. In selected embodiments, an interface may include two flanges extending in opposite directions from a body. The flanges may have various apertures extending therethrough for admitting fasteners. The fasteners may be used to secure the interface to the base or to secure a face plate to the interface. In selected embodiments, an interface may be omitted. In such embodiments, a fastener may pass through a face plate and extend directly to engage a receiver on a base.

U.S. patent application Ser. No. 10/342,701 filed Jan. 15, 2003 and entitled DEFLECTING SECUREMENT ANCHOR FOR ELECTRICAL FIXTURES (Pub. No. US 20030109173A1) and U.S. patent application Ser. No. 10/793,186 filed Mar. 4, 2004 and entitled CLIP-ON FACE PLATE FOR ELECTRICAL FIXTURES are hereby incorporated by reference.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 32, is not intended to limit the scope of the invention, as claimed, but is merely representative of various illustrative embodiments of the invention. The illustrative embodiments of the invention will be best understood by reference to the drawings, wherein like parts are designated by like numerals throughout.

Figure 1:
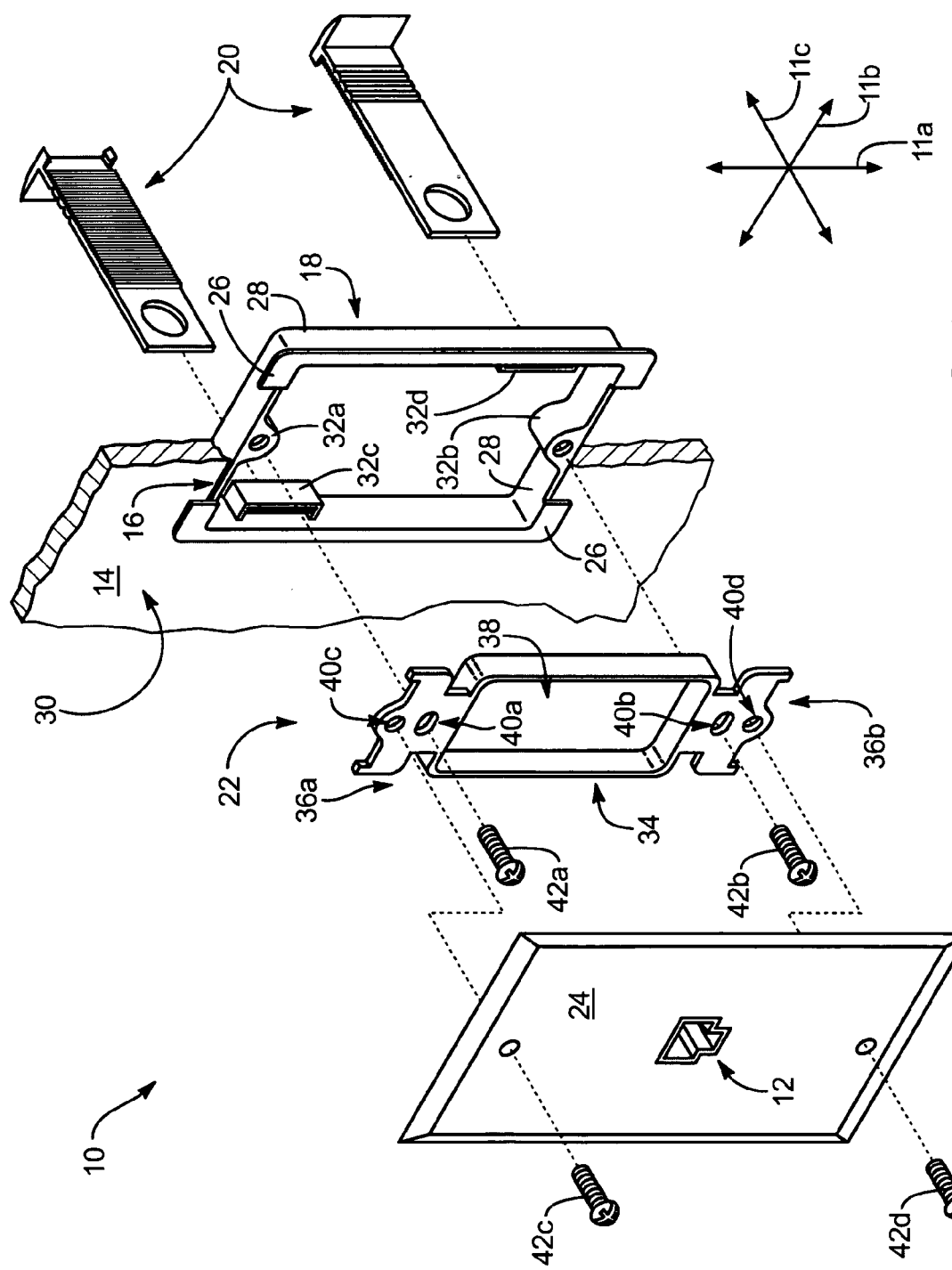
FIG. 1 is an exploded, perspective view of a low voltage terminal assembly in accordance with the present invention.

Referring to FIG. 1, in discussing the Figures, it may be advantageous to establish a reliable coordinate system to aid in the description of several of the embodiments in accordance with the present invention. Coordinate axes 11 may be defined by longitudinal 11a, lateral 11b, and transverse directions 11c substantially orthogonal to one another.

In certain situations, a terminal assembly 10 may secure a fixture 12 to a panel 14 (e.g. plasterboard of a wall). A fixture 12 may be any suitable piece for which securement is desired. For example, a fixture 12 may be a telephone jack, network jack, cable connector, stereo system connector, information system connector, or any other unit 12 for which permanent or removable securement at a panel 14 may be desired.

In certain embodiments, a terminal assembly 10 may be a low voltage terminal assembly 10. In such embodiments, safety concerns may not require an enclosed connection box to contain the various wires and connections. Such are required only for comparatively high voltage terminal assembles (e.g. power receptacles, power switches, wall outlets). Accordingly, a low voltage (e.g. 1–30 volts) terminal assembly 10 may simply include the structure to accomplish securement, without regard to enclosure.

In many situations, low voltage terminal assemblies 10 are prepared in a manner very similar to high voltage terminal assemblies. That is, low voltage terminal assemblies 10 may include fully enclosed connection boxes. For example, in situations where builders anticipated the placement of a phone jack, network jack, etc., a connection box may be secured to a stud before paneling 14 is applied. However, in other situations, a low voltage terminal assembly 10 may be applied to a panel 14 after completion of the structure. In such situations, paneling 14 may block access to studs or other support members, thereby making it more difficult to secure a connection box. Accordingly, a low voltage terminal assembly 10 in accordance with the present invention may be arranged to secure to a panel 14 itself, rather than to a stud or other support member.

In certain embodiments, an aperture 16 may be formed in a panel 14. A base 18 may abut the panel 14 proximate the aperture 16. One or more securements 20 may engage the base 18 to sandwich the panel 14 between the base 18 and the securement 20. An interface 22 may provide the structure for connecting a face plate 24 to the base 18. The face plate 24 may secure the fixture 12.

A base 18 in accordance with the present invention may have any suitable shape. In general, the aperture 14 may be formed to match the shape of the base 18. For example, the aperture 16 may have a generally rectangular shape to match a generally rectangularly shaped base 18.

In selected embodiments, a base 18 may be shaped to frame (i.e. form a border around) the aperture 16. In one embodiment, a base 18 may include a flange 26 and an insert 28. The flange 26 may abut the exterior surface 30 of the panel 14. The insert 28 may extend some distance into the aperture 16. A base 18 may also include one or more receivers 32. Selected receivers 32a, 32b may be shaped and positioned to secure the interface 22, while other receivers 32c, 32d may be shaped and positioned to receive and engage securements 20.

A base 18 may be constructed of any suitable material. Suitable materials may include, without limitation, metals, metal alloys, polymers, composites, and the like. In one embodiment, abase 18 comprising a flange 26, an insert 28, and receivers 32 may be formed as a substantially homogeneous unit molded from a polymer. A base 18, in accordance with the present invention, may be of any suitable size. For example, a base 18 may arranged to secure face plates 24 that are single gang, double gang, triple gang, quadruple gang, quintuple gang, or the like. The concepts presented herein are illustrated as single gang low voltage terminal assemblies 10, however, the principles and concepts may easily be expanded to multiple-gang low voltage terminal assemblies 10.

An interface 22 in accordance with the present invention may be any structure connecting a face plate 24 to a base 18. In one embodiment, an interface 22 may include a body 34 with one or more flanges 36 extending therefrom. The body 34 may have an aperture 38 extending therethrough. The aperture 38 may provide a location for wires, etc. to pass through the interface 22 and reach the fixture 12.

In selected embodiments, an interface 22 may include two flanges 36a, 36b extending in opposite directions from a body 34. The flanges 36a, 36b may have various apertures 40 extending therethrough for admitting fasteners 42. For example, a first flange 36a may have two apertures 40a, 40c formed therein. One aperture 40a may receive a fastener 42a for engaging a receiver 32a and securing the interface 22 to the base 18. The other aperture 40c may receive a fastener 42c for securing the face plate 24 to the interface 22. Similarly, a second flange 36b may have two apertures 40b, 40d formed therein. One aperture 40b may receive a fastener 42b for engaging a receiver 32b and securing the interface 22 to the base 18. The other aperture 40d may receive a fastener 42d for securing the face plate 24 to the interface 22.

In selected embodiments, an interface 22 may be omitted. In such embodiments, a first fastener 42a may pass through a face plate 24 and extend directly to engage a first receiver 32a on a base 18. Similarly, a second fastener 42d may pass through a face plate 24 and extend direct to engage a second receiver 32b on a base 18. If desired, the location of the receivers 32a, 32b may be repositioned to correspond to the position of the fasteners 42c, 42d extending through the face plate 24. Alternatively, the face plate 24 may be modified so the fasteners 42c, 42d extend therethrough to meet the receivers 32a, 32b.

Figure 2:
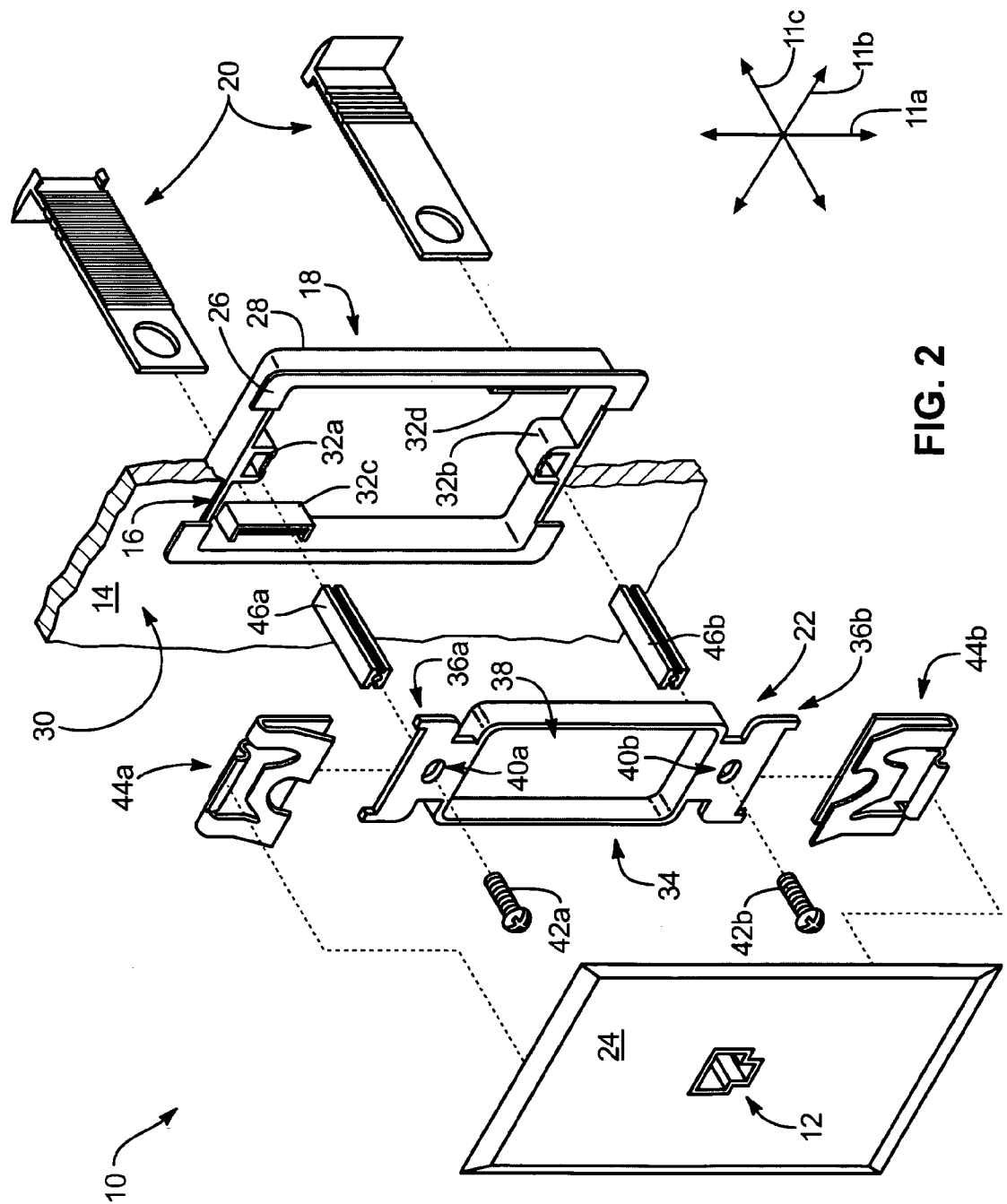
FIG. 2 is an exploded, perspective view of an alternative embodiment of a low voltage terminal assembly in accordance with the present invention.

Referring to FIG. 2, in certain applications, screws and other fasteners 42 may be unsightly and time-consuming to install. In these applications, it may be desirable to provide a snap-on face plate 24 to provide fast securement without the use of screws. In certain embodiments, a clip 44 may have a shape selected to engage the flange 36 of an interface 22. For example, a clip 44a, 44b may be curved or shaped to sandwich a corresponding flange 36a, 36b of an interface 22.

A clip 44 in accordance with the present invention may be formed to engage a face plate 24. In selected embodiments, a first clip 44a may engage one end of a face plate 24, while a second clip 44b engages an opposite end of the face plate 24. Accordingly, the clips 44a, 44b may secure the face plate 24 to the interface 22 without the use of screws 42c, 42d.

In certain embodiments, an anchor 46 may extend from an interface 22. The anchor 46 may be arranged to engage a receiver 32 positioned on the base 18. In selected embodiments, the method of engagement between a receiver 32 and an anchor 46 may be selected to provide a fast, clean securement. By so doing, the interface 22 may be secured to the base 18 in a minimum amount of time. A fastener 42 may be introduced to secure an anchor 46 to the appropriate location on a interface 22 by a manufacturing machine. Thus, the installation of the fastener 42 may be performed in ideal conditions with proper alignment and fast tool speeds. In the field, an anchor 46 may simply be inserted into a receiver 32 to secure the interface 22, and consequently the face plate 24, to the base 18.

In selected applications, multiple points of securement between an interface 22 and a base 18 may exist. In such situations, an anchor 46 in accordance with the present invention may be applied to all or a subset of the securement locations. For example, a first anchor 46a may be secured to extend from a first flange 36a of an interface 22, while a second anchor 46b may be secured to extend from a second flange 36b of the interface 22. A base 18 may have two receivers 32c, 32d to engage both anchors 46a, 46b, respectively.

Figure 3:
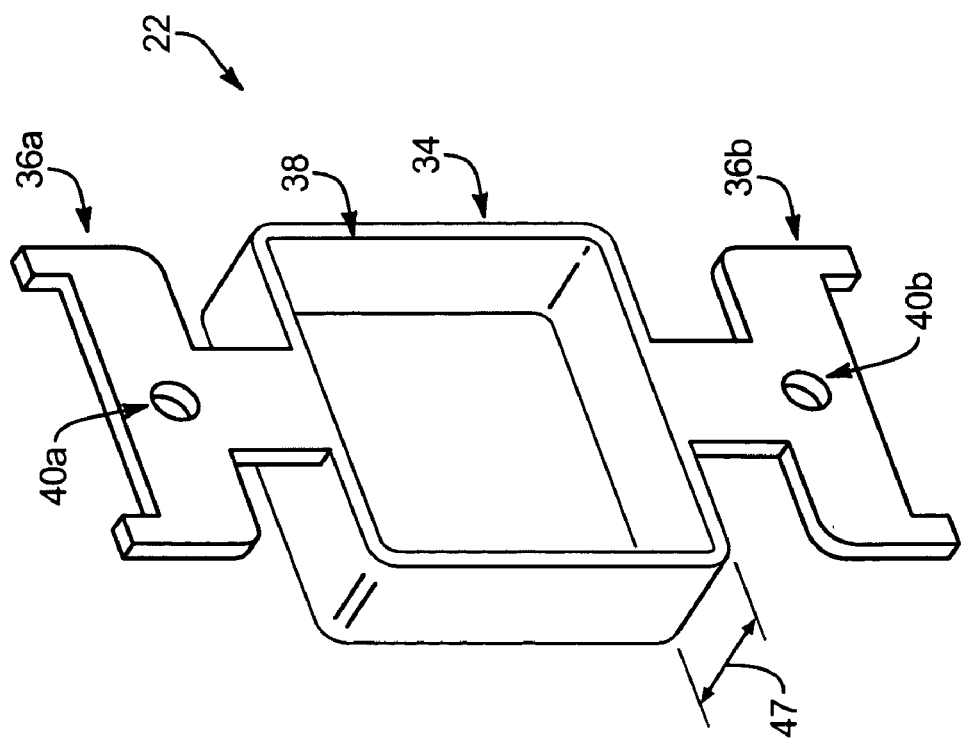
FIG. 3 is a perspective view of an interface in accordance with the present invention.

Referring to FIG. 3, an interface 22 in accordance with the present invention may be formed of any suitable material. Suitable materials may, without limitation, include metals, metal alloys, polymers, composites, and the like. The shape and arrangement of an interface 22 may be determined by balancing the mechanical properties desired and the material used. In selected embodiments, an interface 22 may be molded from a polymer. If desired or necessary, an interface 22 may be molded to include various features (e.g. a body 34 having a thickness 47 in the transverse direction 11c) to provide a desired strength, stiffness, and the like.

Figure 4:
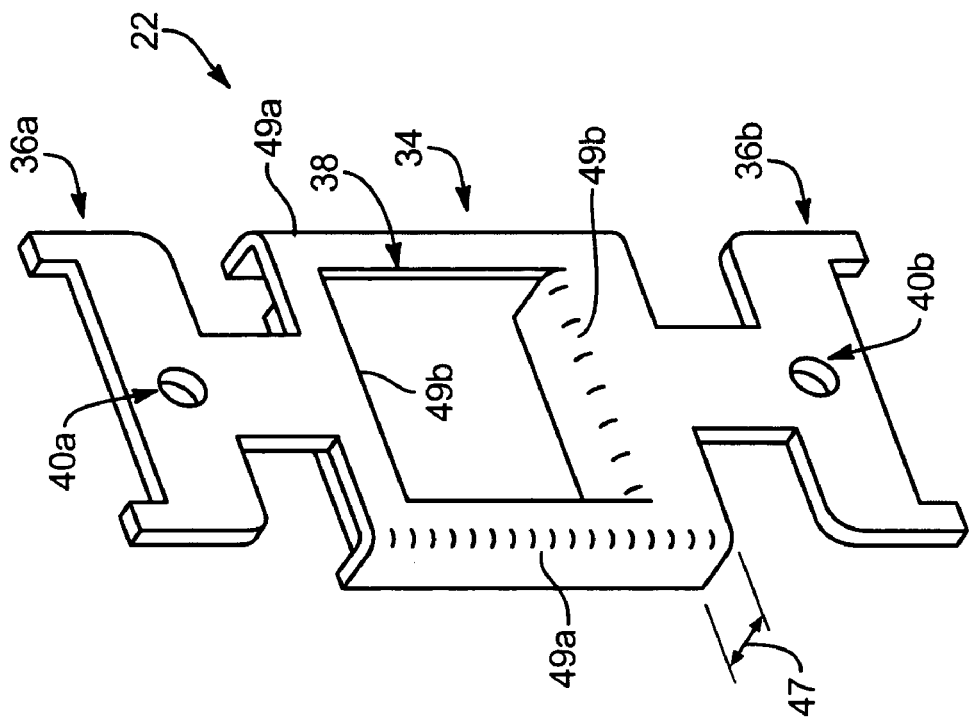
FIG. 4 is a perspective view of an alternative embodiment of an interface in accordance with the present invention.
Figure 5:
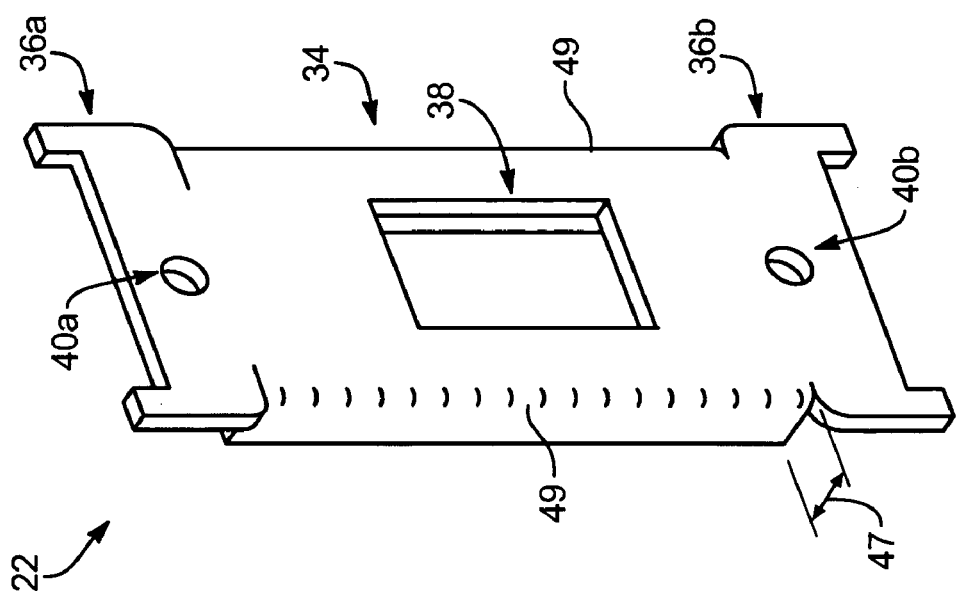
FIG. 5 is a perspective view of another alternative embodiment of an interface in accordance with the present invention.

Referring to FIGS. 4 and 5, in an alternative embodiment, an interface 22 may be formed of thin sheet metal. Various bends 49 may be formed in the interface 22 to increase the effective thickness 47 thereof. This increase in thickness 47 may, in turn, increase the section modulus of the interface 22 to create a stronger and stiffer device. In selected embodiments, bends 49 may extend in more than one direction. For example, one or more bends 49a may applied to stiffen the interface 22 in the longitudinal direction 11a, while one or more bends 49b may be applied to stiffen the interface 22 in the lateral direction 11b.

Figure 6:
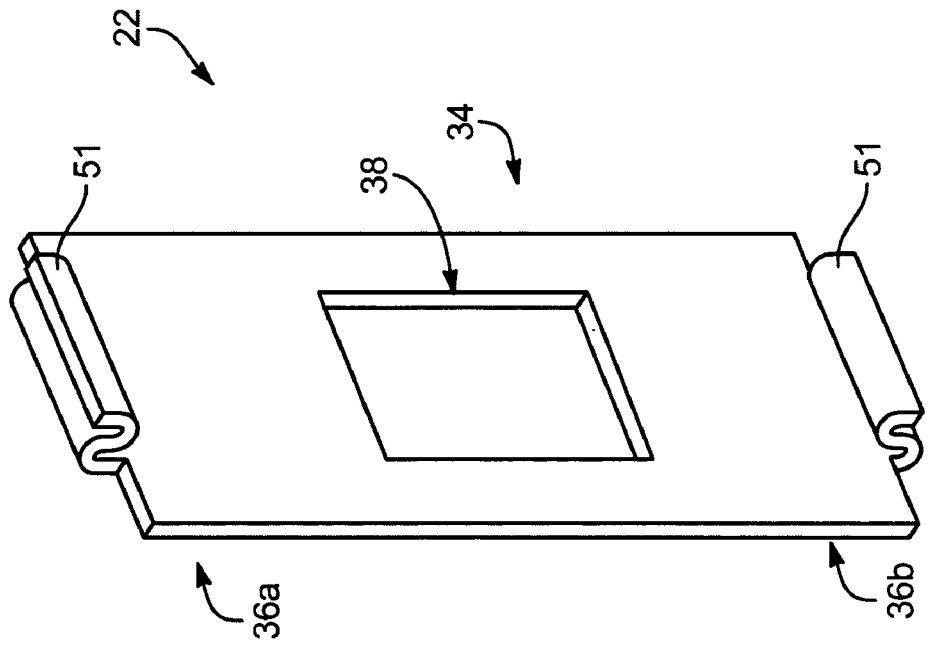
FIG. 6 is a perspective view of another alternative embodiment of an interface in accordance with the present invention.

Referring to FIG. 6, in certain embodiments, it may be desirable to provide an interface 22 that directly engages a face plate 24 without clips 44. For example, in one embodiment, an interface 22 may include one or more retainers 51 shaped to engage a face plate 24. The retainers 51 may be formed to be resiliently deflectable to snap in and out of engagement with the face plate 24.

Figure 7:
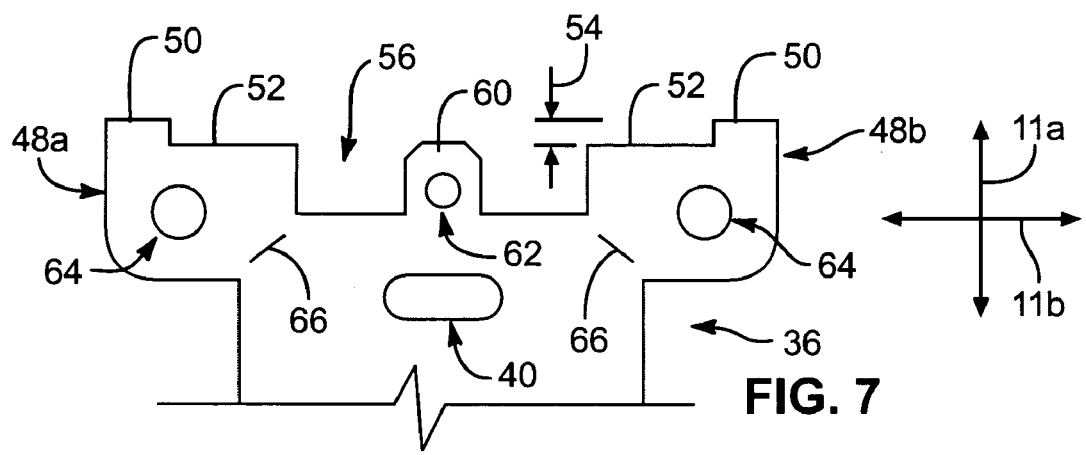
FIG. 7 is a front, elevation view of one embodiment of a flange from an interface in accordance with the present invention.

Referring to FIG. 7, in selected embodiments, a flange 36 (which may be a first flange 36a, second flange 36b, etc,) extending from a body 34 may include two ears 48a, 48b. The ears 48a, 48b may be spaced apart in the lateral direction 11b. An ear 48 in accordance with the present invention may be formed to have an extended portion 50, most distant from the body 34, and a recessed portion 52, spaced away from the extended portion 50 toward the body 34. In selected embodiments, at least one ear 48 may have an extended portion 50 terminating at a distal edge thereof, away from the body 34, along a line extending substantially in the lateral direction 11b. In an alternative embodiment, both ears 48 may have an extended portion 50 terminating at a distal edge thereof, away from the body 34, along a line extending substantially in the lateral direction 11b.

In selected embodiments, at least one ear 48 may have a recessed portion 52 presenting an edge extending in the lateral direction 11b. In one alternative embodiment, both ears 48 may have recessed portions 52 each presenting an edge extending in the lateral direction 11b. In certain embodiments, the ears 48a, 48b may align so the extended portions 50 define a clearance 54 or void 54 therebetween. If desired, the ears 48 may be formed to be symmetric with respect to a line in the longitudinal direction 11a.

In certain embodiments in accordance with the present invention, each ear 48 may be positioned at the outermost corners of a flange 36. The ears 48 may form an opening 56 therebetween in the flange 36. The ears 48 may have interior edges 58 forming the extremes of the opening 56 (e.g. defining) extending in the lateral direction 11b.

Figure 8:
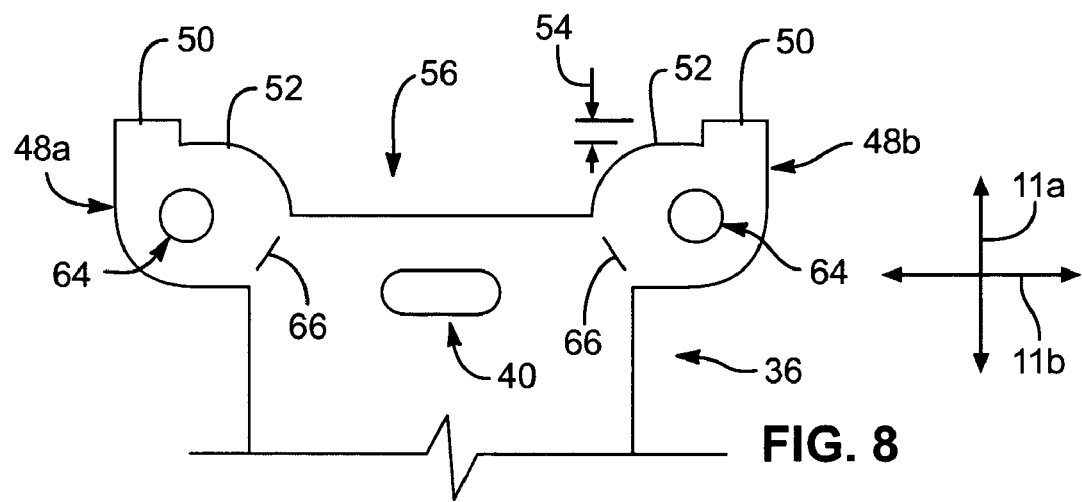
FIG. 8 is a front, elevation view of an alternative embodiment of a flange from an interface in accordance with the present invention.
Figure 9:
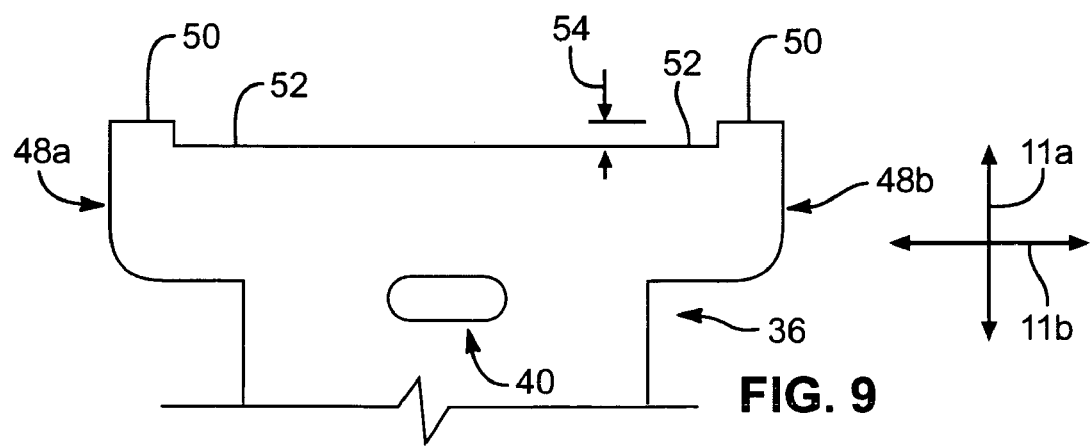
FIG. 9 is a front, elevation view of another alternative embodiment of a flange from an interface in accordance with the present invention.

Referring to FIGS. 8 and 9, ears 48 and flanges 36 in accordance with the present invention may have any suitable shape. For example, a projection 60 may be positioned to extend into the opening 56. The projection 60 may have an aperture 62 formed therein. The aperture 62 may be positioned and threaded to support securement of a face plate 24 thereto in a conventional manner. In selected embodiments, ears 48 in accordance with the present invention may have additional apertures 64 formed therein as desired. In certain embodiments, the location 66 where an ear 48 joins with the rest of the flange 36 may be scored. A scored location 66 may provide a stress concentration riser for controlled breakage for optional removal of an ear 48 when desired, without tools.

In certain embodiments, the recess portion 52 of an ear 48 may be rounded. In other embodiments, the recessed portion 52a of one ear 48a may extend to meet the recessed portion 52b of another ear 48b. In such a configuration, the opening 56 may be omitted.

An interface 22 may be constructed of any suitable material. In one embodiment, an interface 22, including a body 34 and flanges 36 with ears 48, may be formed as a substantially homogeneous unit molded from a polymeric composition. In another embodiment, an interface 22, including a body 34 and flanges 36 with ears 48, may be stamped from a single, solid blank of stock (e.g. stamped from sheet metal).

Figure 10:
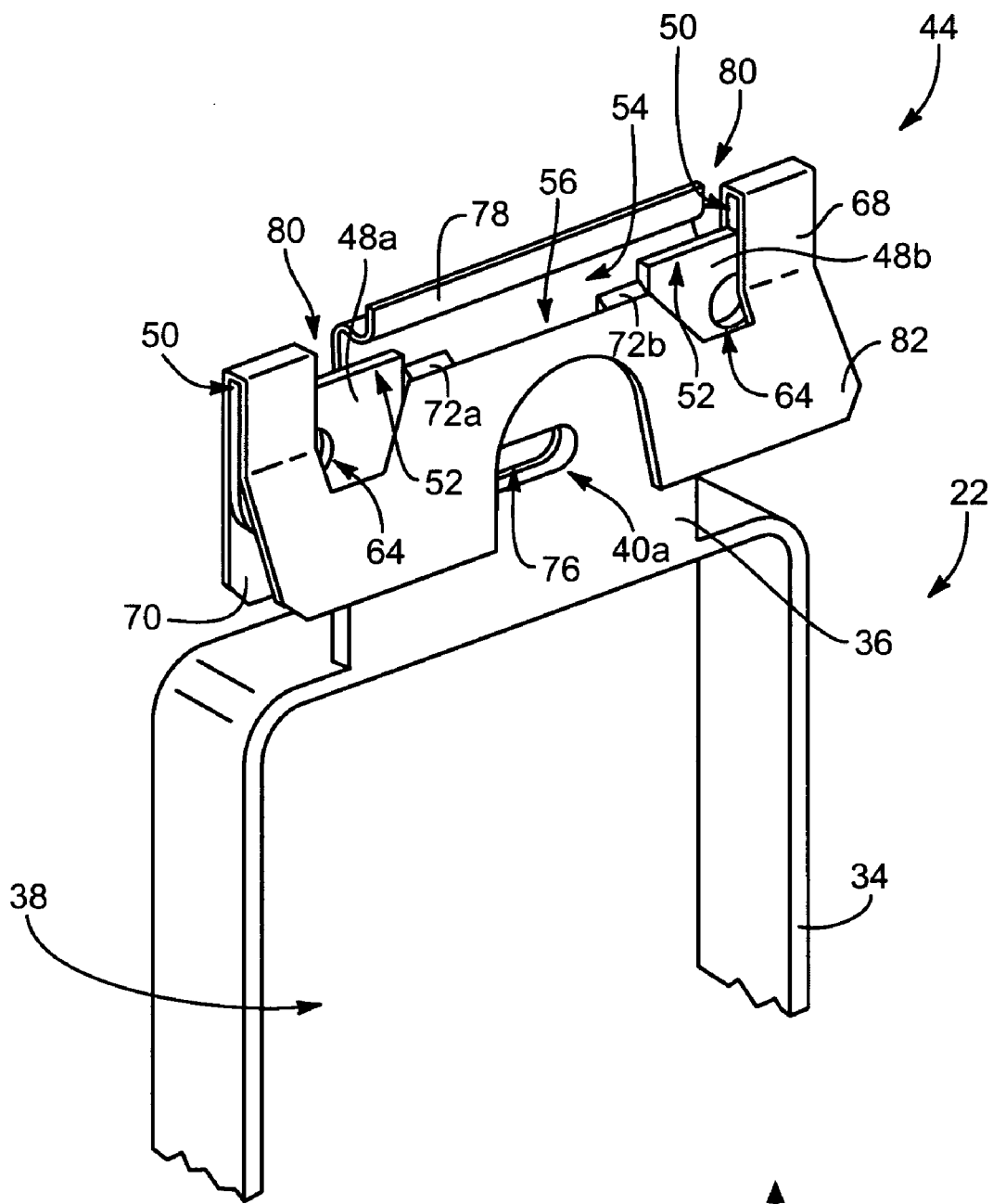
FIG. 10 is a partial, perspective view of a clip for securing a screwless fact plate, the clip applied to an interface in accordance with the present invention.
Figure 10:
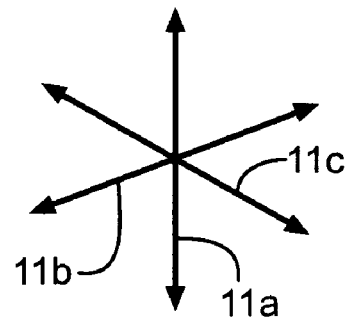

Referring to FIG. 10, in certain embodiments, a flange 36 in accordance with the present invention may have a clip 44 applied thereto. In one embodiment, as mentioned hereinabove, clips 44a, 44b may be applied to both the first and second flanges 36a, 36b. A clip 44 may have a front grip 68 and a back grip 70 sized to engage and hold a flange 36 therebetween. The extended portions 50 of the ears 48 may register the clip 44 in the longitudinal direction 11a with respect to the flange 36.

If desired, at least one of the front and back grips 68, 70 may include a detent 72 to register the clip 44 in the lateral direction 11b with respect to a flange 36. In selected embodiments, the detent 72 may be formed as a protrusion 72 formed in the back grip 70. In one embodiment, a detent 72 includes two protrusions 72a, 72b, each protrusion 72a, 72b engaging an interior edge 58a, 58b of the opening 56 corresponding to a flange 36 at either end of an interface 22 to which the clip 44 is applied.

In selected embodiments, a clip 44 may include an aperture 74 or notch 74 that may accommodate a fastener 42. The aperture 74 may provide clearance for the fastener 42, thus, enabling the clip 44 to sit flush with the surface of the flange 36. The aperture 74 may also interact with the fastener 42 to form a detent mechanism. That is, the fastener 42, in conjunction with the aperture 74, may act as a piloting mechanism to effectively align and situate the clip 44 with respect to the flange 36. If desired, an aperture 76 may be formed in the back grip 70 of the clip 44 to permit a fastener 42 to pass therethrough.

A retainer 78 may extend from a clip 44 to engage a face plate 24. Slots 80 may be formed where the retainer 78 connects to the rest of the clip 44. If desired, the slots 80 may extend a selected distance into the back grip 70. The slots 80 may increase flexibility and deflection of the retainer 78, thus providing a smoother engagement with the face plate 24. In certain embodiments, the slots 80 may terminate in a rounded end to resist the formation of a stress riser upon deflection of the retainer 78.

In certain embodiments, a lip 82 may be formed to extend a substantial distance from the clip 44. An extended lip 82 may provide a spring biasing the retainer 78 into a firm engagement with the face plate 24. That is, the lip 82 may act as a spring to substantially remove the play between the retainer 78 and the face plate 24.

A clip 44 in accordance with the present invention may be formed of any suitable material. Suitable materials may include, for example, metals, metal alloys, polymers, composites, and the like. For example, a clip 44 may be stamped from a single sheet or panel of metal (e.g. steel). Alternatively, a clip 44 may be molded using a polymer.

Figure 11:
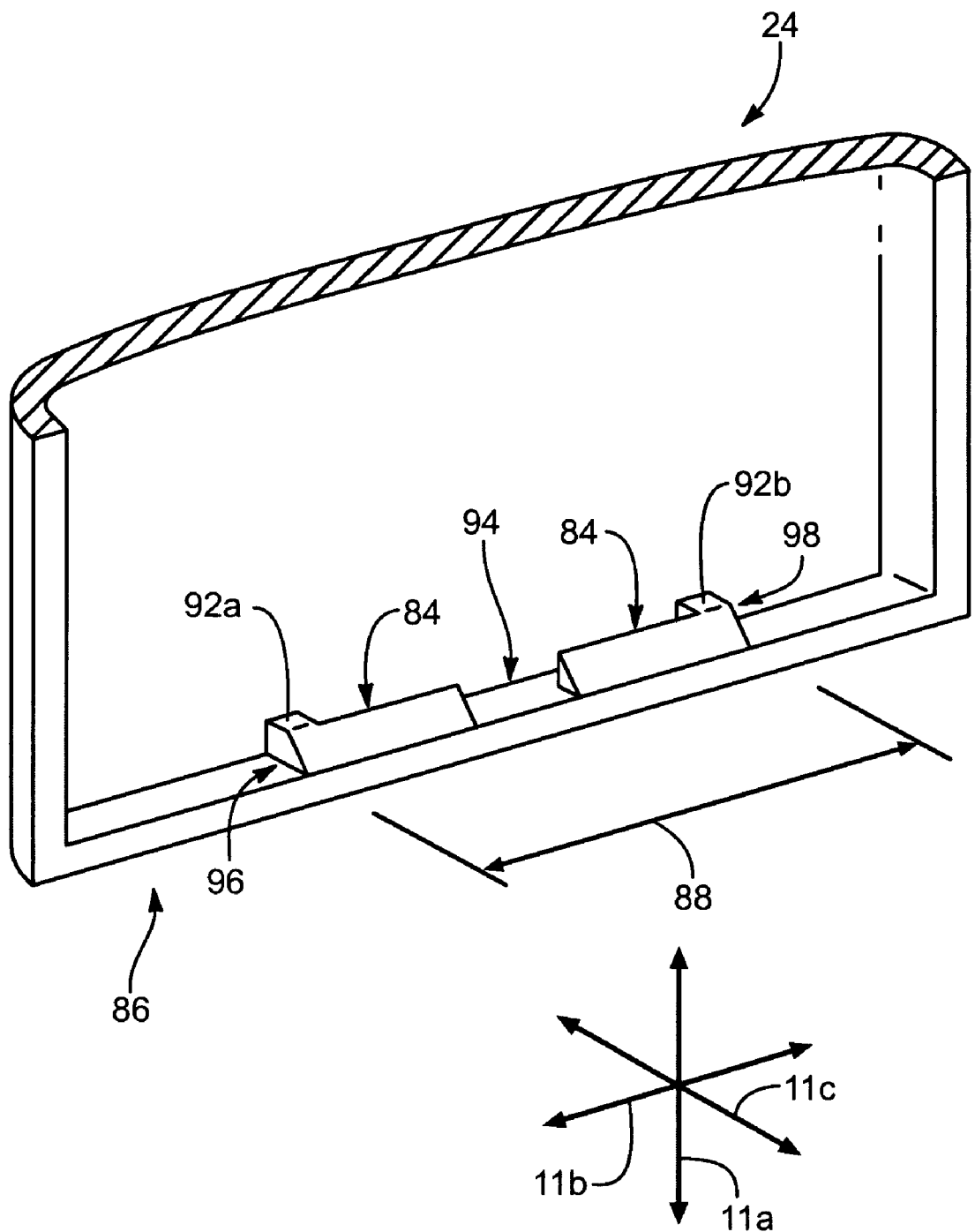
FIG. 11 is a partial, perspective view of a screwless fact plate in accordance with the present invention.

Referring to FIG. 11, in selected embodiments, a face plate 20 in accordance with the present invention may be formed with a barb 84 or engagement lip 84 shaped to engage a retainer 78 of a clip 44 without tools. In certain embodiments, an engagement lip 84 may be positioned proximate a first edge 86 of the face plate 24. Another engagement lip may be positioned proximate a second edge positioned opposite the first edge 86. An engagement lip 84 in accordance with the present invention may be continuous along its length 88. Alternatively, an engagement lip 84 may be provided in sections 90 so as to be discontinuous.

An engagement lip 84 in accordance with the present invention may be formed of any suitable material. If desired, an engagement lip 84 may be formed of the same material as the rest of the face plate 24. In one embodiment, engagement lips 84 may be homogeneously molded as extensions of the material of the face plate 24.

In certain embodiments, a face plate 24 in accordance with the present invention may include a stop 92 to resist motion in the lateral direction 11b of the retainer 78 with respect to a face plate 24 while the retainer 78 engages the face plate 78 in the transverse direction 11c. Such a stop 92 may be positioned anywhere along the length 88 of the engagement lip 84. In one embodiment, a stop 92 may be positioned proximate the center 94 of the engagement lip 84. If desired, the corresponding retainer 78 may be notched to engage the engagement lip 84 on opposite sides of the stop 92. In an alternative embodiment, a first stop 92a may be positioned proximate a first end 96 of the engagement lip 84 while a second stop 92b is positioned proximate a second end 98 of the engagement lip 84.

Figure 12:
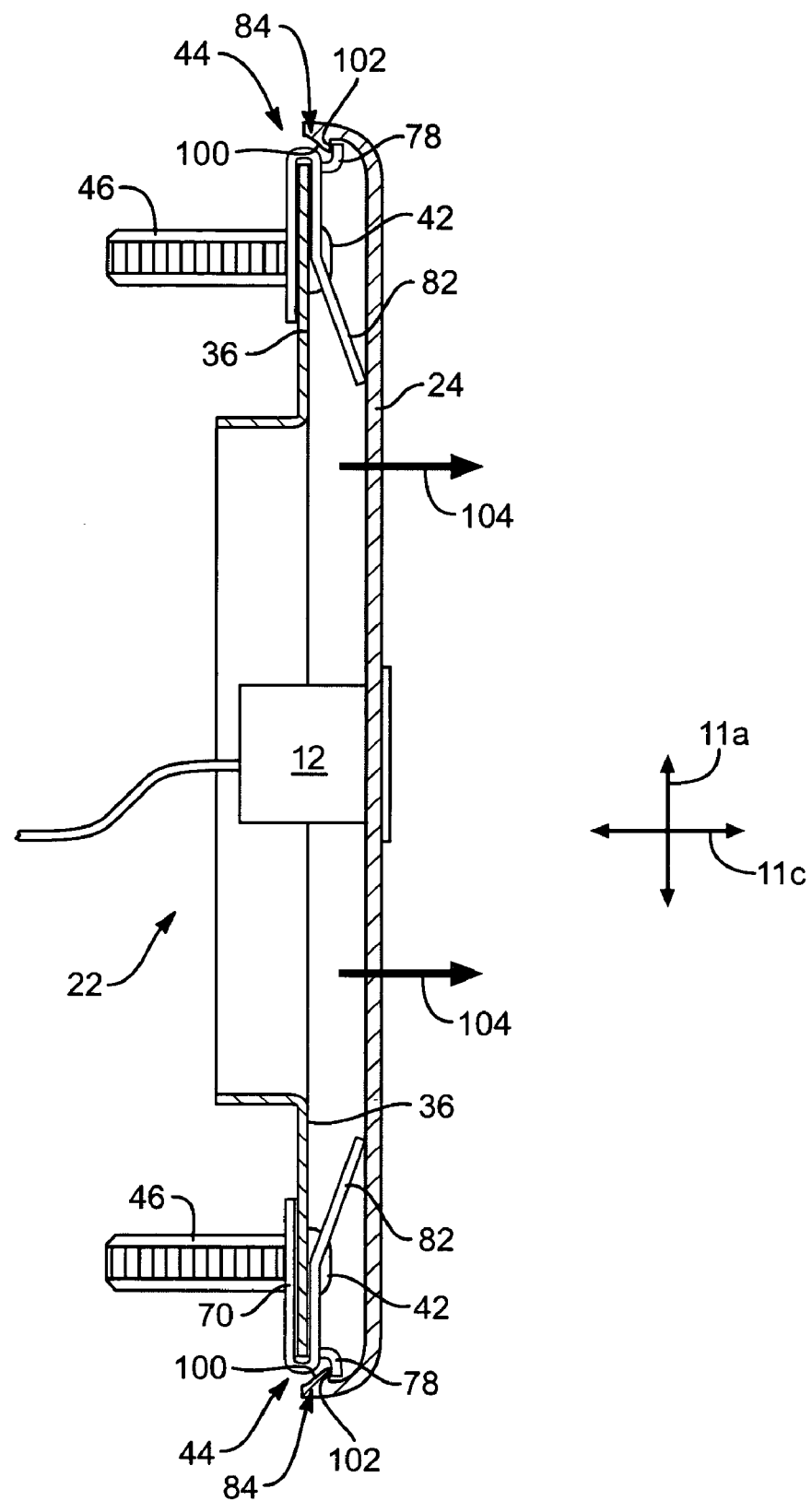
FIG. 12 is a side, cross-sectional view of an interface with anchors and clips secured to a screwless fact plate in accordance with the present invention.

Referring to FIG. 12, a face plate 24 may include engagement lips 84 position at opposite ends thereof. The engagement lips 84 may each include a ramp 100 and an engagement edge 102. When a face plate 24 is applied to an interface 22 equipped with clips 44, the retainers 78 may deflect while sliding along the ramps 100 until passing over the engagement edges 102. Once the retainer 78 has engaged the engagement edge 102, the lips 82 of the clips 44 may exert forces 104 on the face plate 24. The forces 104 may urge the retainers 78 against the engagement edges 102, thus reducing the play (e.g. tolerance) that may be present in the engagement of the interface 22 with the face plate 24.

Figure 13:
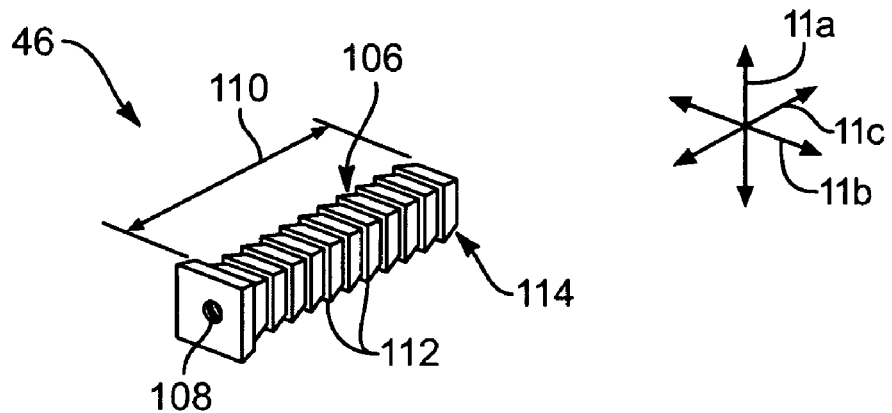
FIG. 13 is a perspective view of one embodiment of an anchor in accordance with the present invention.

Referring to FIG. 13, an anchor 46 in accordance with the present invention may be constructed, formed, machined, extruded, molded, cast, or otherwise made from any suitable material. Suitable materials may include without limitation metals, metal alloys, polymers, composites, and the like. For example, in certain embodiments, an anchor 46 may be formed of a polymer in a molding process.

An anchor 46 may be secured to an interface 22 in any suitable manner. In certain embodiments, an anchor 46 may be secured to an interface 22 by a fastener 42 such as a bolt, rivet, screw, engagement prong, engagement hook, or the like. In other embodiments, an anchor 46 may be glued or otherwise bonded to an interface 22. Additionally, an anchor 46 may be formed as a homogeneous unit with the interface 22.

Each form of attachment between the anchor 46 and an interface 22 may have particular advantages. In certain applications, such as the installation of computer network outlets 12, cable television outlets 12, and the like, an installer may need to remove an interface 22 to gain access to something (e.g. wiring) tucked therebehind. In such a situation, screws 42 may provide an ideal attachment between the anchor 46 and the interface 22. The screws 42 may be removed, thus freeing the interface 22. The anchors 46 may maintain engagement with the base 18. After the revisions are complete the interface 22 may once again be secured to the anchors 46 by the insertion of the screws 42 previously removed.

An anchor 46 in accordance with the present invention may have an engagement mechanism 106 configured to provide a mechanical grip with a receiver 32. If an anchor 46 is to be secured to an interface 22 by a bolt 42 or screw 42, an aperture 108 may be formed therein. The aperture 108 may extend completely or only partially through the anchor 46 in a transverse direction 11c.

A length 110 of the engagement mechanism 106 may be selected to provide a desired number of engagement locations 112. In selected embodiments, each engagement location 112 is a tooth 112. Additionally, the engagement length 110 and the number of engagement locations 112 may be selected to permit insertion of the anchor 46 a desired distance into the receiver 32, providing a desired alignment of the interface 22 with respect to the base 18.

A receiver 32 may include an engagement mechanism corresponding to the engagement mechanism 106 of an anchor 46. For example, when an anchor 46 includes a series of teeth 112, a receiver 32 may include a barb for unidirectionally engaging the teeth 112. That is, the barb may pass over the teeth 112 upon insertion of the anchor 46 into the receiver 32, but engage the teeth 112 to resist extraction of the anchor 46 form the receiver 32. In certain embodiments, one end 114 of the anchor 46 may be formed to promote easy insertion into the receiver 32. For example, an end 114 may be pointed, rounded, tapered, or otherwise formed to self center or self pilot.

An anchor 46 in accordance with the present invention may have any suitable cross-section. For example, the cross-section may be rectangular, circular, triangular, oval, an unconventional shape, or the like. In selected embodiments, the cross-sectional shape of an anchor 46 may be selected to resist rotation about an axis extending in the transverse direction 11c once installed inside a receiver 32. For example, an anchor 46 having a generally circular cross-section may have a key-way formed therein to correspond to a key formed or located in the receiver 32.

The shape and configuration of a receiver 32 may be selected to match and complement the particular shape of a selected anchor 46. For example, if an anchor 46 having a rectangular cross section is desired, the receiver 32 may be formed to have a generally rectangular shape. Thus, the receiver 32 may admit the anchor 46 and hold the anchor 46 securely without motion (e.g rotation about an axis extending in the transverse direction 11c) therebetween.

Figure 14:
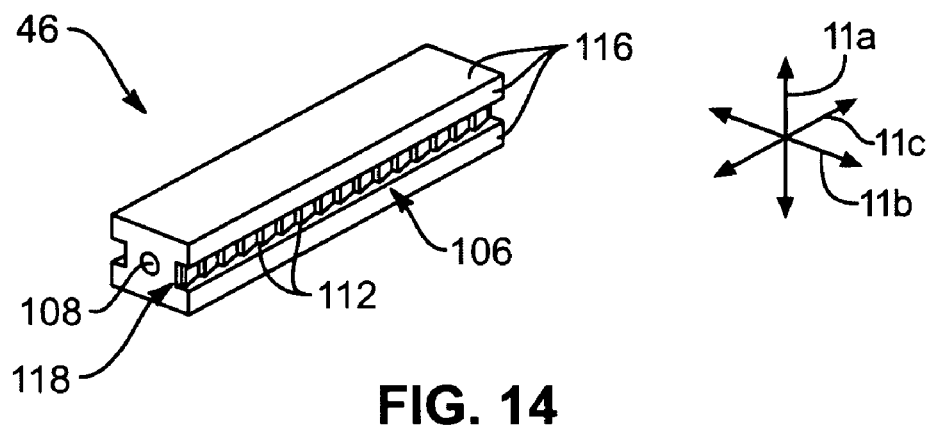
FIG. 14 is a perspective view of an alternative embodiment of an anchor in accordance with the present invention.

Referring to FIG. 14, in certain embodiments, an anchor 46 may have multiple sliding surfaces 116 to promote ease of insertion and proper alignment. A recessed groove 118 may be formed in one or more surfaces 116 of the anchor 46 to provide a location for disposition of an engagement mechanism 106. Such an engagement mechanism 106 may be recessed to reduce the risk of interfering with proper insertion of the anchor 46 into the receiver 32.

Figure 15:
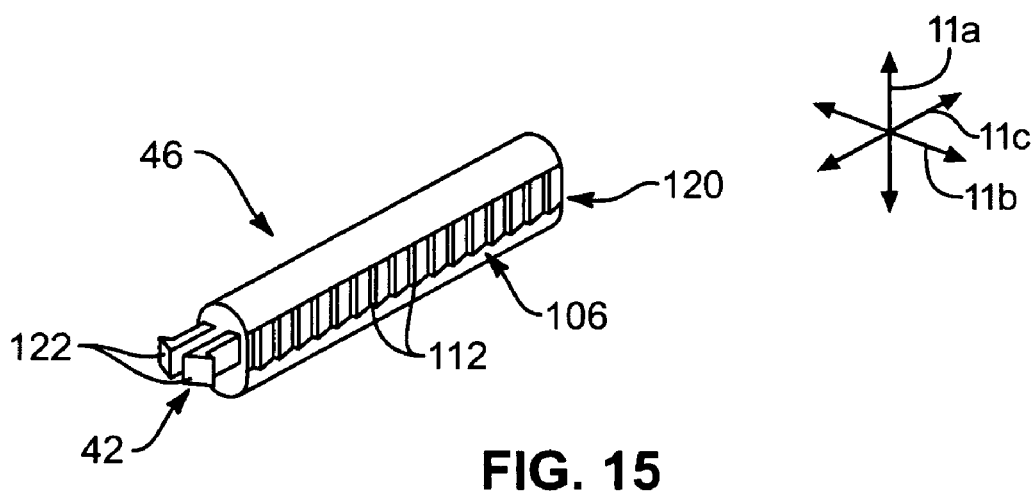
FIG. 15 is a perspective view of another alternative embodiment of an anchor in accordance with the present invention.

Referring to FIG. 15, an anchor 46 may have a generally circular cross-section. In such an embodiment, the anchor 46 may include a single flat 120 or a plurality of flats 120 that provide a location for disposition of an engagement mechanism 106. The flats 120 may also provide a location for a corresponding receiver 32 to register or otherwise engage the anchor 46 to resist rotation about an axis extending in the transverse direction 11c.

FIG. 15 also illustrates an alternative embodiment of a fastener 42 in accordance with the present invention. Opposing engagement hooks 122 may be shaped to promote insertion into a corresponding aperture 40 in an interface 22. The engagement hooks 122 may be formed to engage an aperture of any suitable shape (e.g. circular, oval, triangular, or the like). The illustrated engagement hooks 122 have been formed in a shape to fit a square aperture 40. A square or rectangular aperture 40 may provide a mechanism to resist rotation of the anchor 46 with respect to a corresponding interface 22. Engagement hooks 122 in accordance with the present invention may flex to allow an anchor 46 to be separated from the interface 22. Once separated, the anchor 46 and interface 22 may be reattached by reinserting the engagement hooks 122 of the anchor 46 through the corresponding aperture 40 in the interface 22.

Figure 16:
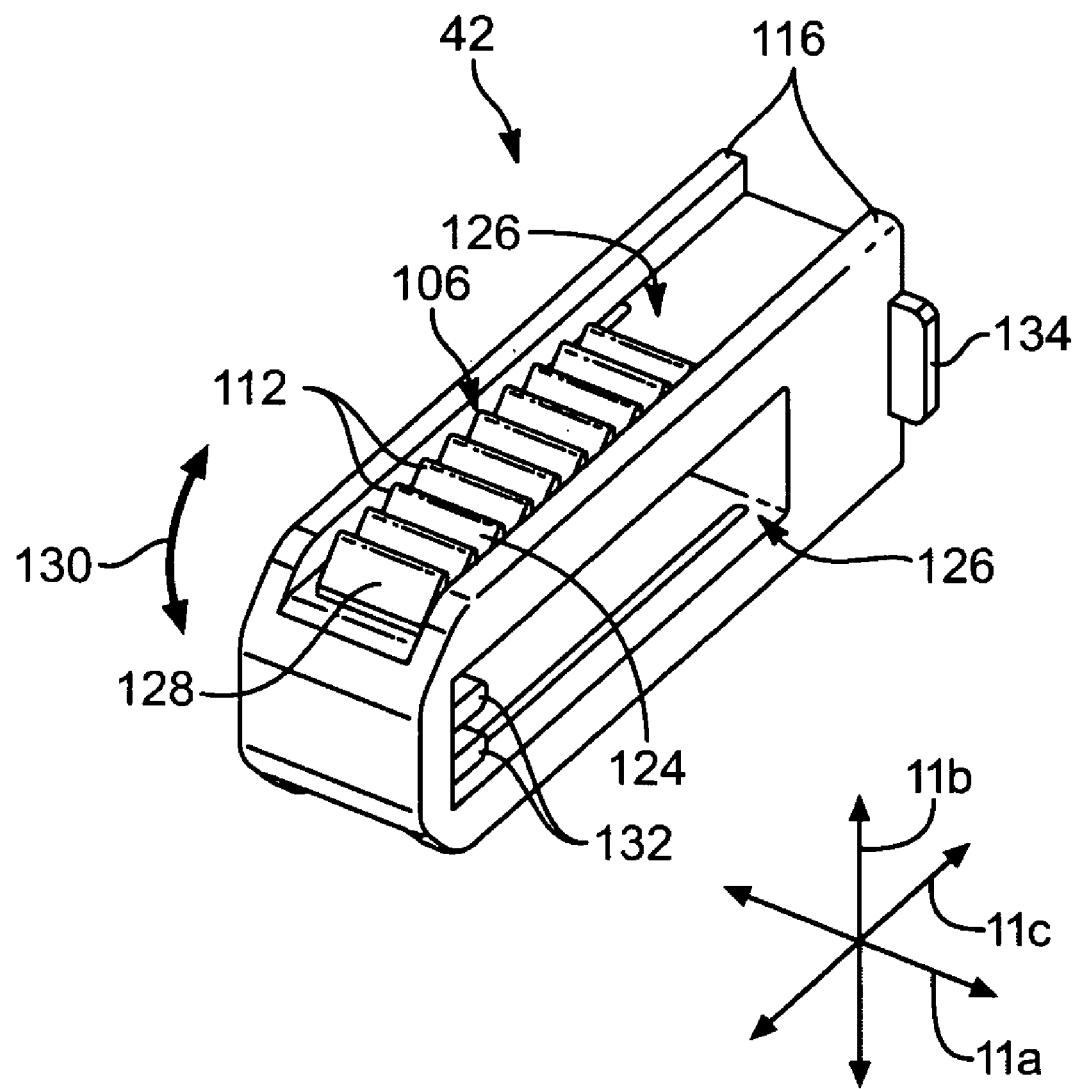
FIG. 16 is a perspective view of another alternative embodiment of an anchor in accordance with the present invention.

Referring to FIG. 16, in certain embodiments, upon insertion, the engagement mechanism 106 of the anchor 46 may structurally interfere with the engagement mechanism of the receiver 32. Thus, further insertion of the anchor 46 into the receiver 32 may be problematic. For example, in embodiments where the interference between the teeth 12 of an anchor 46 and barb or barbs of a receiver 32 becomes an issue, either the anchor 46, the receiver 32, or both the anchor 46 and the receiver 32 may flex or deflect to ameliorate the resistance to insertion.

In selected embodiments, an anchor 46 in accordance with the present invention may be dynamic when interacting with the receiver 32. For example, the engagement mechanism 106 of the anchor 46 may be formed as a cantilever 124. The cantilever 124 may secure to the rest of the anchor 46 at a flex point 126. A distal end 128 of the cantilever 124 may extend in the transverse direction 11c away from the flex point 126. Thus, the distal end 128 of the cantilever 124 may resiliently flex in a lateral arc 130 providing deflection of the engagement mechanism 24 in substantially the lateral direction 11b.

A cantilever 124 may have any configuration to provide a desired resiliency, strength, deflection amplitude, spring constant, and the like. For example, the cantilever 124 may have a thickness and a width selected to provide an effective spring constant for deflection of the distal end 128 of the cantilever 124. Generally, the thicker and wider the cantilever 124, the greater the spring constant for any material. If desired, the thickness, width, or both of the cantilever 124 may vary along a length thereof. The length of the cantilever may also be varied to control the spring constant of the cantilever 124. In certain embodiments, fillets or radiused corners may be employed at the flex point 126 to resist the formation of stress risers that may result in premature failure of the cantilever 124.

The location of the engagement mechanism 106 on the cantilever 124 may be varied to provide a desired performance. Points on the cantilever 124 closer to the flex point 126 deflect less distance in the lateral direction 11b than do points on the cantilever 124 closer to the distal end 128. The engagement mechanism 106 may be positioned to take advantage of this disparity in deflection along the length of the cantilever 124. For example, in certain embodiments, the engagement locations 112 may be spaced some distance from the flex point 126. This spacing may increase the deflection of the engagement locations 112 in the lateral direction 11a, while decreasing the force necessary for causing that deflection.

In certain embodiments, even after the engagement locations 112 are spaced from the flex point 126, interference between the engagement locations 112 of the anchor 46 and the engagement mechanism of the receiver 32 may be excessive. In such embodiments, additional adaptations to the engagement locations 112 may be applied. For example, in embodiments where the engagement locations 112 are teeth 112, the teeth 112 proximate the flex point 126 may gradually decrease in height. For example, while proximate teeth 112 may not deflect as far as the distal teeth 112 near the distal end 128, the proximate teeth 112 may have less height to clear the barb or barbs of the receiver 32. In other embodiments, where the number of necessary engagement locations 112 is limited, the teeth 112 closest to the flex point 126 may be omitted, thus, effectively increasing the spacing (e.g. pitch) of the teeth 112 from the flex point 126.

In selected embodiments, various stops may be incorporated into the anchor 46 design to improve performance. For example, a deflection stop 132 may be placed on the anchor 46 to resist or limit how far the distal end 128 of a cantilever 124 may inwardly deflect. In other embodiments, an insertion stop 134 may be added to a suitable location on the anchor 46. The insertion stop 134 may resist over insertion of the anchor 46 in the receiver 32. An insertion stop 134 may be formed for easy removal (e.g. by breaking or tearing) so that in certain applications, the anchor 46 may have no barrier to insertion. If desired, an insertion stop 134 may be positioned to facilitate its removal even after installation. Thus, if necessary, once the insertion stop 134 is removed, the anchor 46 may be pushed completely through, and out of, the receiver 32.

Figure 17:
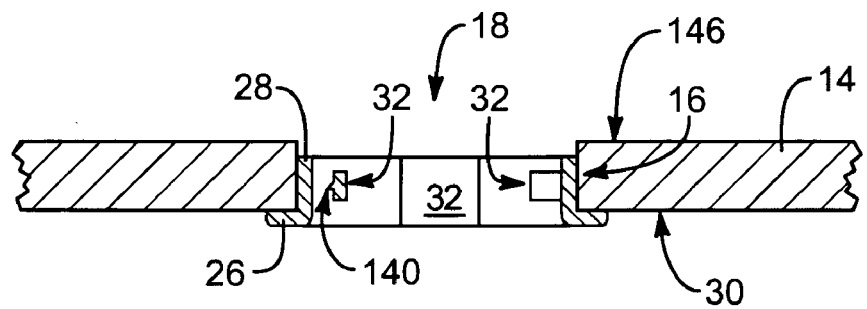
FIG. 17 is a top, cross-sectional view of base in accordance with the present invention applied to an aperture in a panel.
Figure 18:
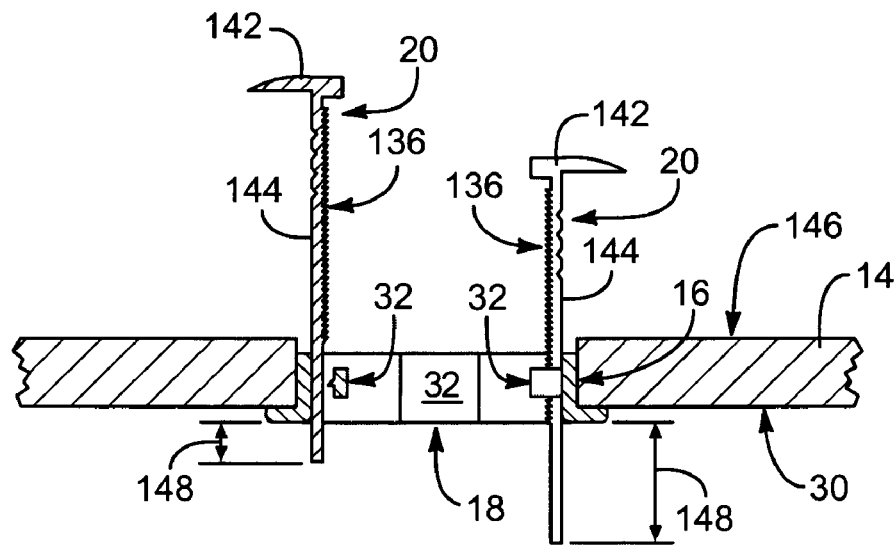
FIG. 18 is a top, cross-sectional view of the base in FIG. 17 with securements partially inserted.
Figure 19:
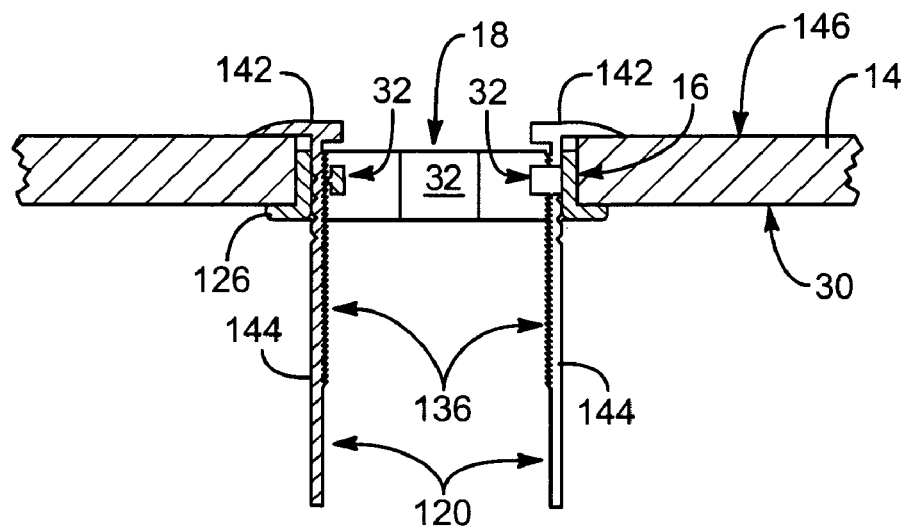
FIG. 19 is a top, cross-sectional view of the base in FIG. 17 with securements completely inserted.

Referring to FIGS. 17–19, a base 18 in accordance with the present invention may have a flange 26 and an insert 28. The flange 26 may abut an exterior surface 30 of the panel 14. The insert 28 may extend some distance into the aperture 16 in the panel 14. In selected embodiments, an insert 28 may assist in centering the base 18 within the aperture 16. In other embodiments, a base 18 may be formed without an insert 28.

A base 18 may also have one or more receivers 32 for receiving and engaging securements 20. Securements 20 in accordance with the present invention may have an engagement mechanism 136 shaped to engage the receivers 32 when inserted therein. The engagement mechanism 136 may act as a ratchet, permitting comparatively easy insertion, but comparatively firmly resisting extraction. The engagement between securements 20 and receivers 32 may be of any suitable form. In certain embodiments, the engagement between the securements 20 and the receivers 32 may be accomplished by a series of teeth 138 forming the engagement mechanism 136 on a securement 20. The teeth 138 may be shaped to engage a barb 140 on the receiver 32. The number of teeth 138 on the securement 20 may be selected to provide multiple securement positions between the securement 20 and receiver 32.

Securements 20 may have any structure suitable to promote their function. For example, the securements 20 may include an extension 142 or retainer 142 and a slide 144. The retainer 142 may engage or abut an interior surface 146 of a panel 14. The slide 144 may extend form the retainer 142, pass through the aperture 16, and engage a receiver 32. Accordingly, a panel 14 may be sandwiched between the flange 26 of a base 18 and the retainer 142 of a securement 20.

A low voltage terminal assembly 10 in accordance with the present invention may be installed in at least two ways. In one embodiment, an insert 28 of a base 18 may be inserted into an aperture 16 formed in the panel 14 until the flange 26 of the base 18 abuts the exterior surface 30. One or more securements 20 may be passed through the aperture 16 and inserted into the back of corresponding receivers 32. The securements 20 may be inserted until a selected length 148 of the securement extends past the flange 26 on the front of the base 18. The securements 20 may then be pulled through the receivers 32 until the retainers 142 abut, or otherwise register with respect to, the interior surface 146 of the panel 14.

In an alternative embodiment, one or more securements 20 may be inserted into the back of corresponding receivers 32 before the base 18 is applied to the panel 14. The securements 20 may be inserted until a selected length 148 of the securement extends past the flange 26 on the front of the base 18. The combination of base 18 and securements 20 may then be positioned in the aperture 16. If desired, an installer may deflect the securements 20 to provide clearance for their insertion into the aperture 16. Alternatively, the base 18 may be rotated so that securements 20 may enter the aperture 16 without deflection being necessary.

Once the retainers 142 of the securements 20 are through the aperture 16, the insert 28 of the base 18 may be inserted into an aperture 16 until the flange 26 of the base 18 abuts the exterior surface 30 of the panel 14. The securements 20 may then be pulled through the receivers 32 until the retainers 142 abut the interior surface 146 of the panel 14.

In either method of installation, the engagement mechanism of the 136 of a securement 20 may engage a corresponding engagement mechanism (e.g. barb 140) of a corresponding receiver 32. This engagement may maintain the base 18 firmly abutted against the exterior surface 30 of the panel 14. If desired, securements 20 may be pulled sufficiently to create a residual tensile force therewithin once released. Accordingly, the flange 26 and retainer 142 may apply a compressive force on the panel 14 to maintain a tight securement of the base 18.

Once the base 18 is secured to the panel 14, a face plate 24 and fixture 12 may be secured thereto by any suitable method. For example, an interface 22 may be secured to the base 18 using one or more fasteners 42 or one or more anchors 46. A face plate 24 may be secured to the interface 22 in the conventional manner using fasteners 42. Alternatively, clips 44 may be used to secure a screwless face plate 24. A screwless face plate 24 may be installed by placing a first clip 44a in engagement with a first engagement lip 84 and then pivoting the face plate 24 therearound until the retainer 78 of the second clip 44b contacts the second engagement lip 84. The face plate 24 may then be pushed against the second clip 44b until the retainer 78 deflects and engages the second engagement lip 84.

Figure 20:
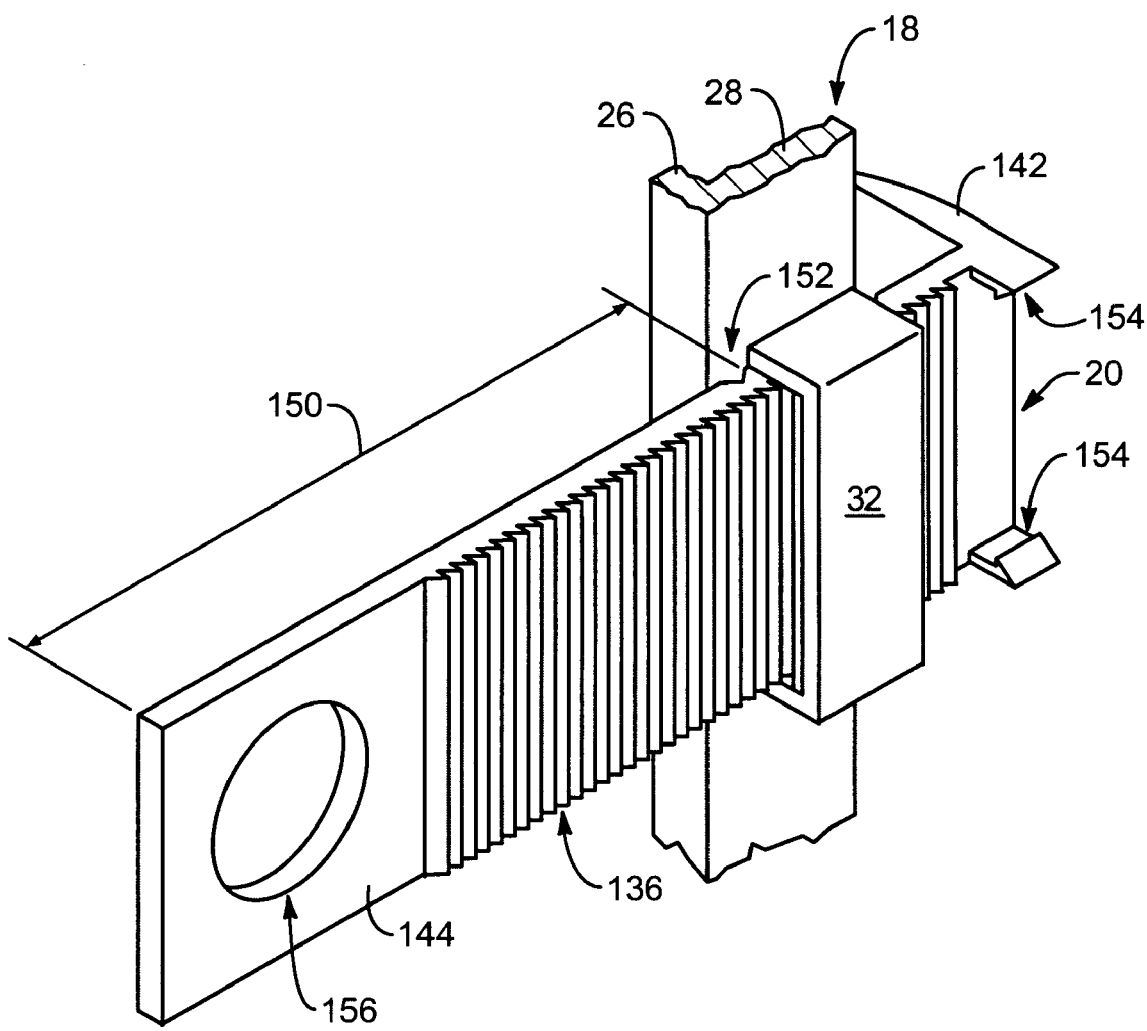
FIG. 20 is a partial, perspective view of a securement in accordance with the present invention inserted into the receiver of a base.
Figure 21:
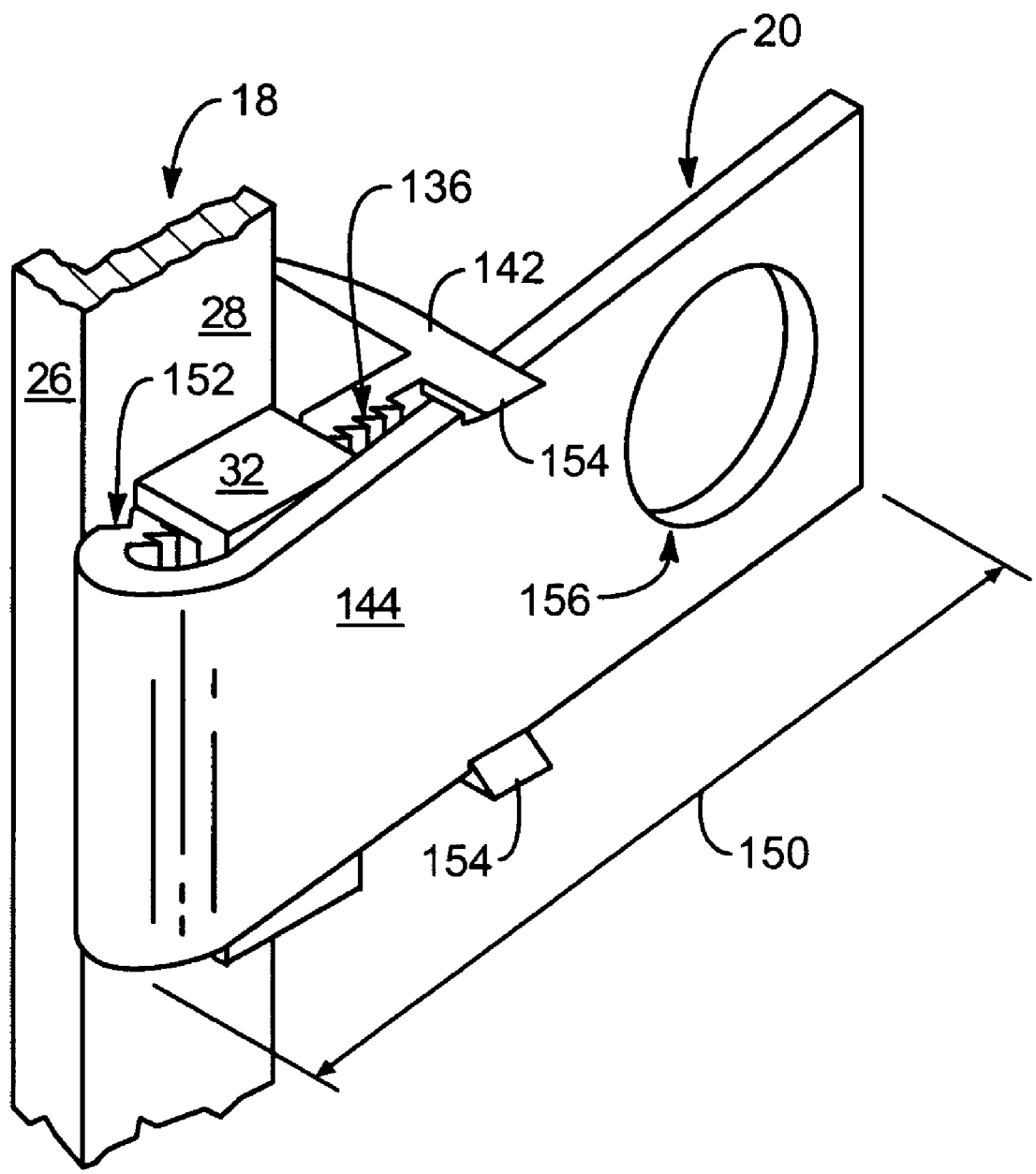
FIG. 21 is a partial, perspective view of a securement in accordance with the present invention inserted into the receiver of a base, the excess length of the securement being held out of the way by barbs extending from the securement.

Referring to FIGS. 20 and 21, securements 20 may be formed in any suitable shape and of any suitable material. Suitable materials may include without limitation metals, metal alloys, polymers, reinforced polymers, composites, and the like. Securements 20 may be formed in any suitable process. In one embodiment, the securements 20 are molded from a polymer.

Securements 20 in accordance with the present invention may be formed to bend or break to remove excess length 150 after being installed. In one embodiment, a securement 20 may be formed of a relatively brittle (e.g. easily fractured) material. A securement 20 may be formed to have one or more fracture regions 152 corresponding to one or more thickness of paneling 14. Once installed, the excess length 150 of the securement 20 may be broken off at the corresponding fracture region 152.

In an alternative embodiment, a securement 20 may be formed of a flexible material. After installation, the excess length 150 may be bent back towards the retainer 142. In selected embodiments, a flexing region 152 may be formed in the securement 20 to facilitate bending. In certain embodiments, a securement 20 may be formed with barbs 154 to engage the excess length 150 when it is bent back and held in that position. Additionally, if desired, the excess length 150 may be formed with an aperture 156. The aperture 156 may permit the securement of wires thereto and prevent wires from being pulled out of the low voltage terminal assembly 10 once installation is begun.

Figure 22:
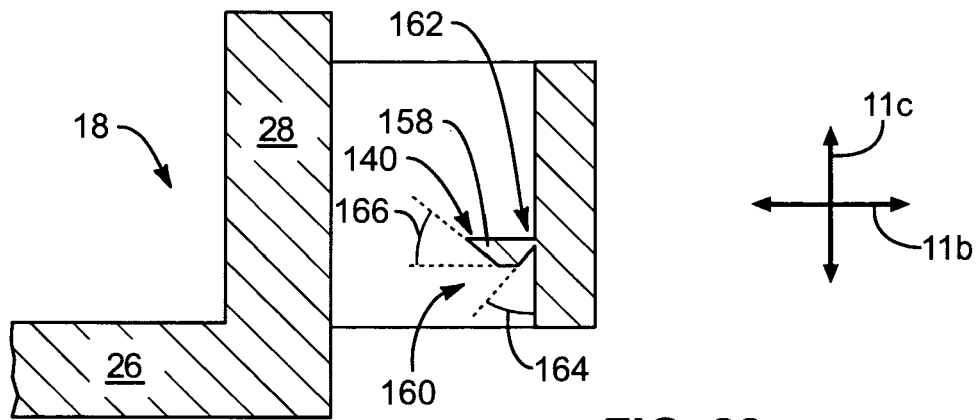
FIG. 22 is a partial, top, cross-sectional view of a receiver having a barb in accordance with the present invention.
Figure 23:
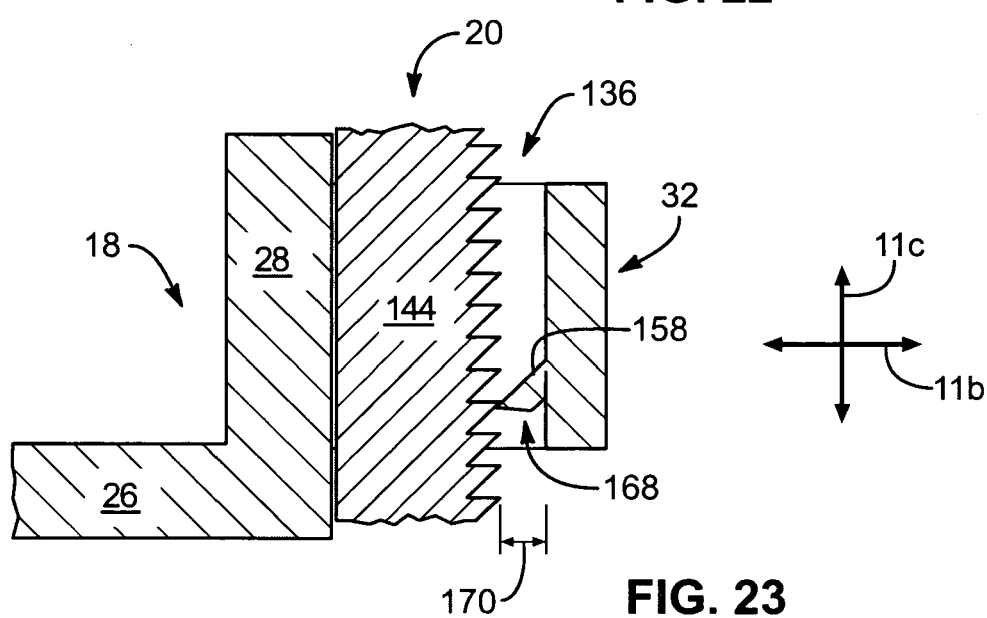
FIG. 23 is a partial, top, cross-sectional view of the receiver of FIG. 22 with the barb deflected to admit a securement.
Figure 24:
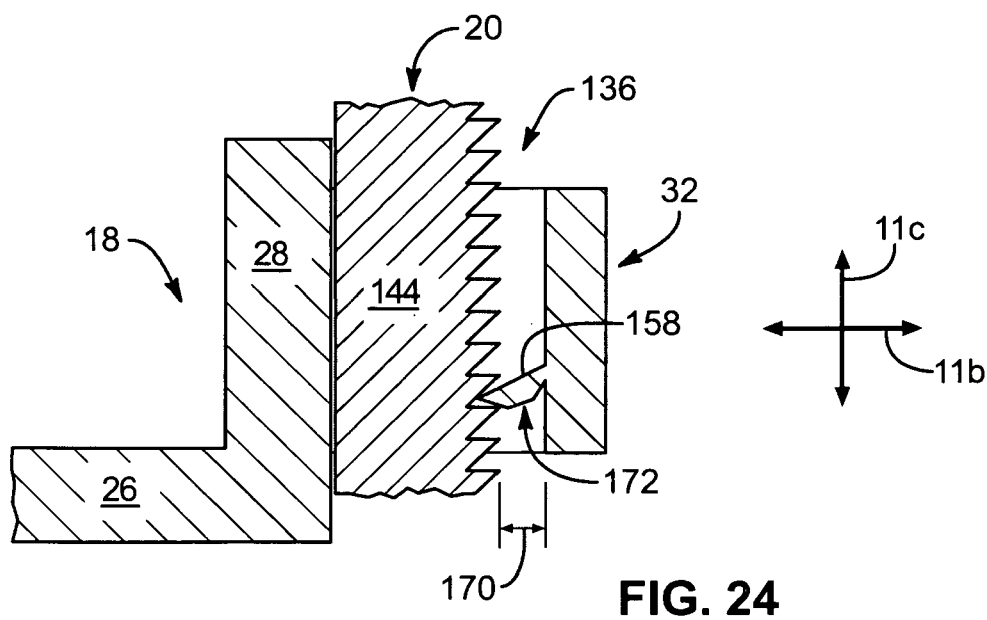
FIG. 24 is a partial, top, cross-sectional view of the receiver of FIG. 22 with the barb engaging a securement to resist extraction of the securement from the receiver.

Referring to FIGS. 22–24, in certain embodiments, a receiver 32 may be formed by a two-piece mold to form one or more extensions 158. An extension 158 may be a barb 140 formed in a neutral position 160 at the location were the two mold halves meet. The extension 158 may be formed with a narrow neck 162 connecting the extension 158 to the rest of the receiver 32. The extension 158 may taper to the narrow neck 162 to form a vertex or folding angle 164. In certain embodiments, an extension 158 may be formed with an engagement angle 166. The engagement angle 166 may be selected to provide a firm engagement with the engagement mechanism 136 of a corresponding securement 20.

Upon insertion of a securement 20 into the receiver 32, the extension 158 may contact the engagement mechanism 136 or teeth 136 and flex at the narrow neck 162. The magnitude of the folding angle 164 may determining how far the extension 158 may deflect in a maximum flex position 168. In certain embodiments, the engagement mechanism 136 (e.g. teeth 136) may be recessed from the slide 144 a selected recess distance 170. The recess distance 170 and the folding angle 164 may be selected to provide the extension 158 with enough deflection and clearance to pass over the teeth 136 during insertion of the slide 144 of a securement 20. That is, the recess distance 170 may provide enough clearance for the extension 158 in the maximum flex position 168 to pass over the teeth 136.

In selected embodiments, the recess distance 170 may be selected to slightly interfere with an extension 158 in a maximum flex position 168. Thus, as each tooth 136 passes the extension 158, there is a resiliency urging the extension 158 into the recesses between the teeth 136 toward an engagement position 172. In an engagement position 172, when the slide 144 is pulled in a direction opposite that of insertion, the extension 158 engages the last tooth 136 to pass by. The extension 158 may then act as a two force member resisting further retraction of the slide 144.

Figure 25:
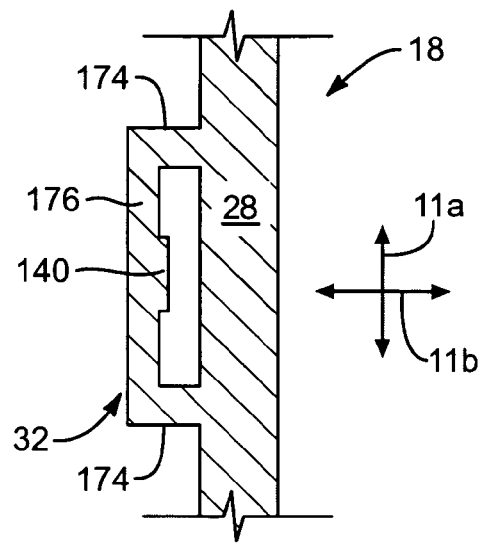
FIG. 25 is a partial, side, cross-sectional view of an alternative embodiments of a receiver having a barb in accordance with the present invention.
Figure 26:
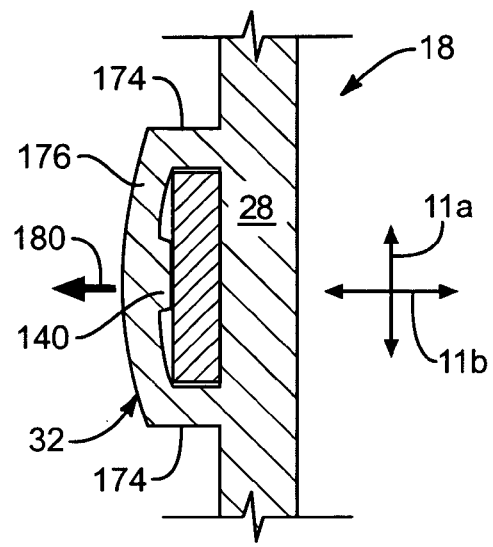
FIG. 26 is a partial, side, cross-sectional view of the receiver of FIG. 25 with the receiver deflected to receive a securement in accordance with the present invention.
Figure 27:
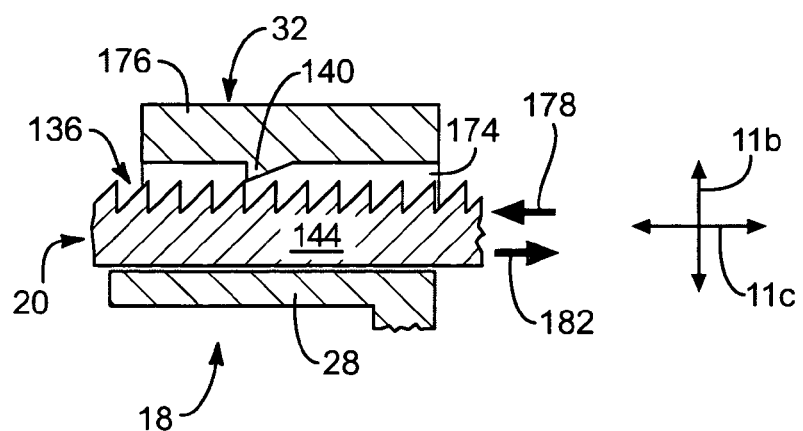
FIG. 27 is a partial, top, cross-sectional view of the receiver of FIG. 25 with the receiver deflected to receive a securement in accordance with the present invention.

Referring to FIGS. 25–27, upon insertion, the engagement mechanism 136 of a slide 144 may structurally interfere with the engagement mechanism (e.g. barb 140) of a receiver 32. This interference may make further insertion of the slide 144 within the receiver 32 difficult. In such situations, the slide 144, the receiver 32, or both may flex or deflect to ameliorate the resistance to insertion.

For example, in one embodiment, a receiver 32 may include two spacers 174 supporting a bridging member 176. A barb 140 may be positioned on the bridging member 176. The barb 140 and the engagement mechanism 136 of the slide 144 may be ramped so that insertion 178 of the slide 144 into the receiver 32 urges the bridging member 176 outward 180. As the bridging member 176 deflects outward 180, the barb 140 may be removed from interference with the engagement mechanism 136.

The barb 140 and engagement mechanism 136 may not be ramped to cause deflection of the bridging member 176 when the slide 144 is extracted 182 form the receiver 32. Accordingly, extraction forces acting on the slide 144 may be resisted. The resulting operation may be a unidirectional rachet in which a slide 144 may easily (comparatively) enter a receiver 32 and resist (firmly) withdrawal therefrom.

Figure 28:
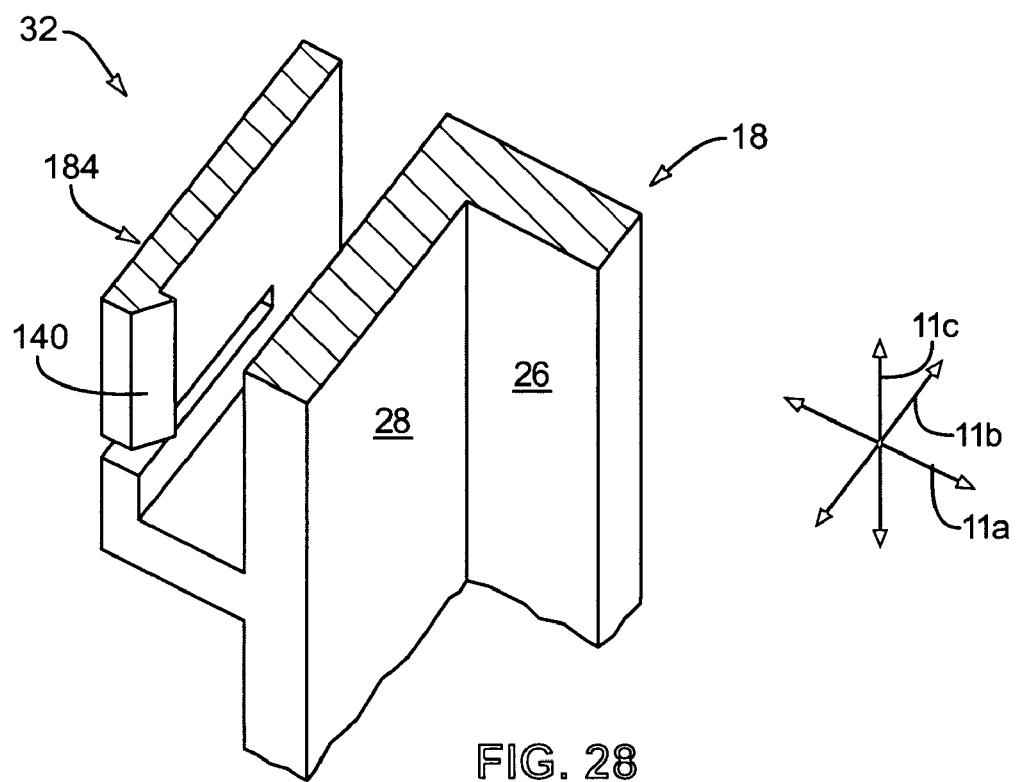
FIG. 28 is a partial, cut-away, perspective view of another alternative embodiment of a receiver in accordance with the present invention.
Figure 29:
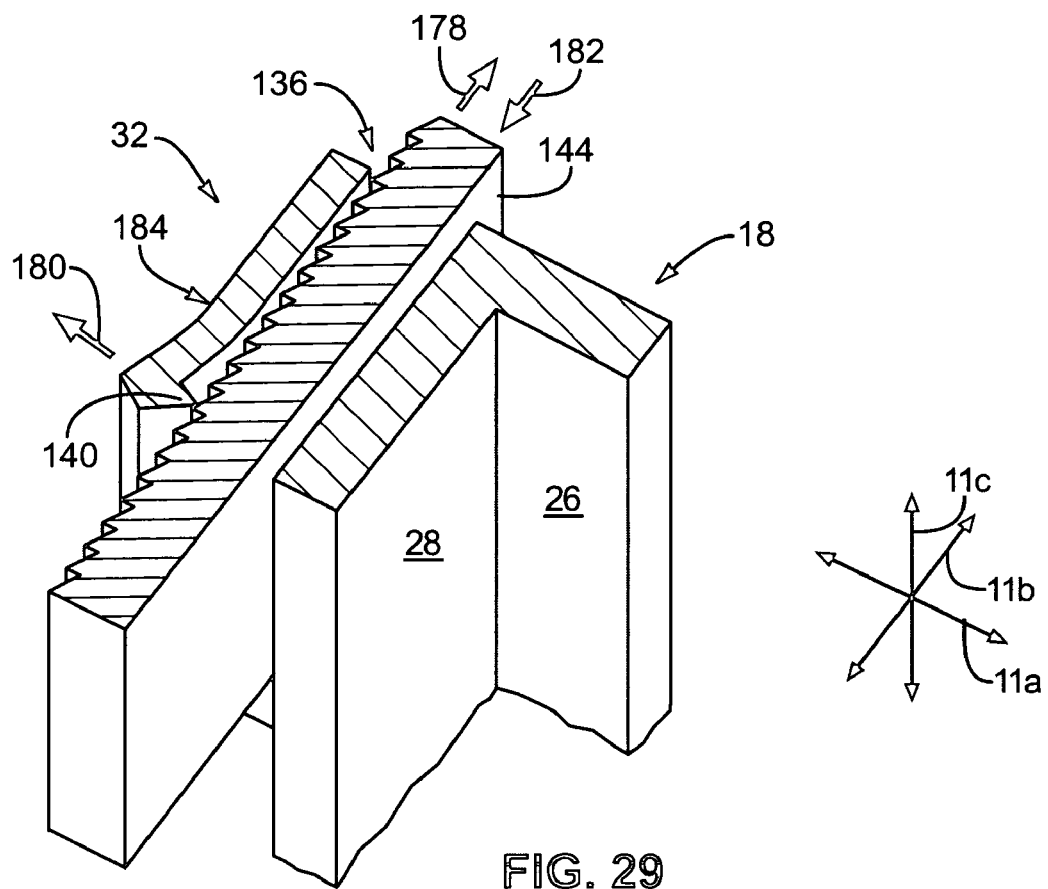
FIG. 29 is a partial, cut-away, perspective view of the receiver of FIG. 28 with the cantilever deflected to receive a securement in accordance with the present invention.

Referring to FIGS. 28 and 29, in an alternative embodiment, a receiver 32 may include one or more barbs 140 positioned on one or more cantilevers 184. The barb 140 and the engagement mechanism 136 of the slide 144 may be ramped so that insertion 178 of the slide 144 into the receiver 32 urges the cantilever 184 outward 180. As the cantilever 184 deflects outward 180, the barb 140 may be removed from interference with the engagement mechanism 136. The barb 140 and engagement mechanism 136 may not be ramped to cause deflection of the cantilever 184 when the slide 144 is extracted 182 form the receiver 32. Accordingly, extraction forces acting on the slide 144 may be resisted.

Receivers 32 in accordance with the present invention may be situated in any suitable position on the base 18. Similarly, receivers 32 may be provided in an suitable quantity. The number and location of the receivers 32 on a base 18 may be selected to provide an adequate and balanced securement of a base 18 in the aperture 16. Receivers 32 may be secured to a base 18 in any suitable manner. In one embodiment, slides 43 may be integrally molded as part of the base 18.

The embodiments of engagements between securements 20 and receivers 32, as illustrated in FIGS. 22–29, could be arranged and designed in a wide variety of different configurations that fall within the scope of the present invention. The description hereinabove is not intended to limit the scope of the possible embodiments, but is merely representative of certain embodiments of devices and systems in accordance with the invention.

Figure 31:
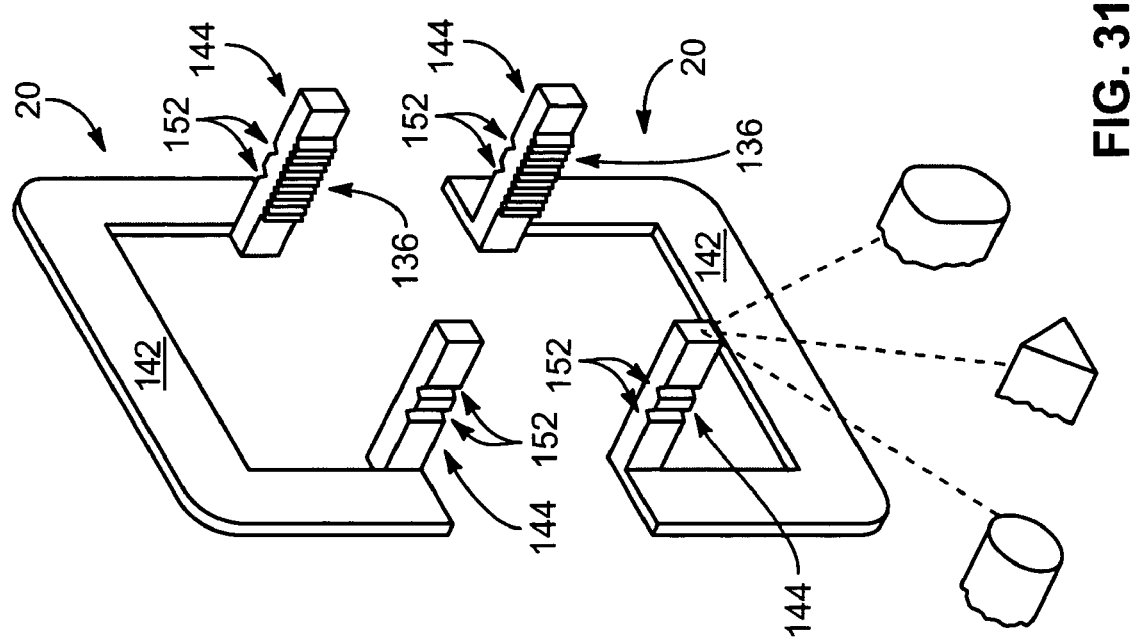
FIG. 31 is a perspective view of another alternative embodiment of a securement in accordance with the present invention.
Figure 30:
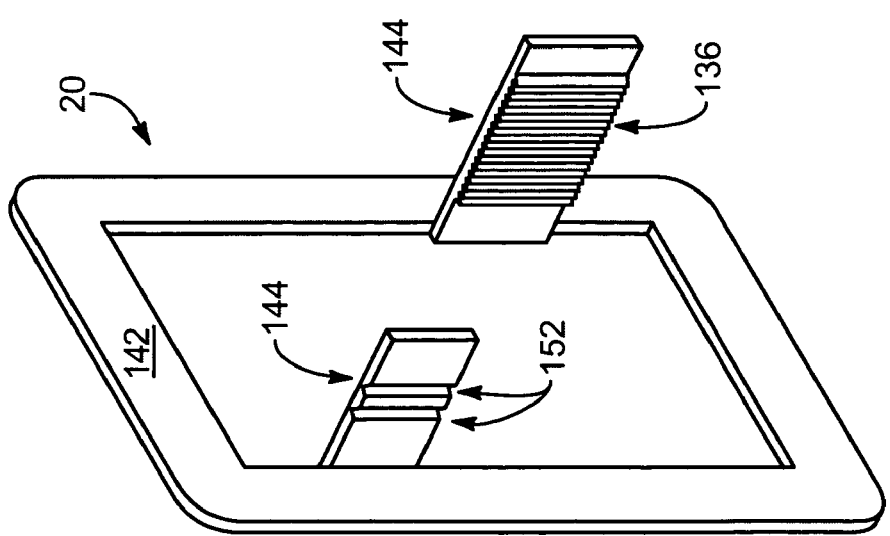
FIG. 30 is a perspective view of an alternative embodiment of a securement in accordance with the present invention.

Referring to FIGS. 30 and 31, securements 20 in accordance with the present invention may have any suitable configuration. A securement 20 need not be limited to one retainer 142 connected to one slide 144. For example, a single retainer 142 may be secured to a base 18 by one or more slides 144. Alternatively, two retainers 142 may each be secure to a base 18 by one or more slides 144.

A retainer 142 may be any structure that provides at least some ability to abut an interior surface 146 of a panel 14. A retainer 142 may abut only a portion of interior surface 146. Alternatively, a retainer 142 may abut the interior surface 146 surrounding the aperture 16. Accordingly, many kinds and varieties of retainers 142 may be suitable.

Slides 144 in accordance with the present invention may have any suitable cross-section. Suitable cross-sections may be rectangular, circular, triangular, oval, or the like. Receivers 32 positioned on a base 18 may be shaped to accommodate and match the shape of the slides 144.

Figure 32:
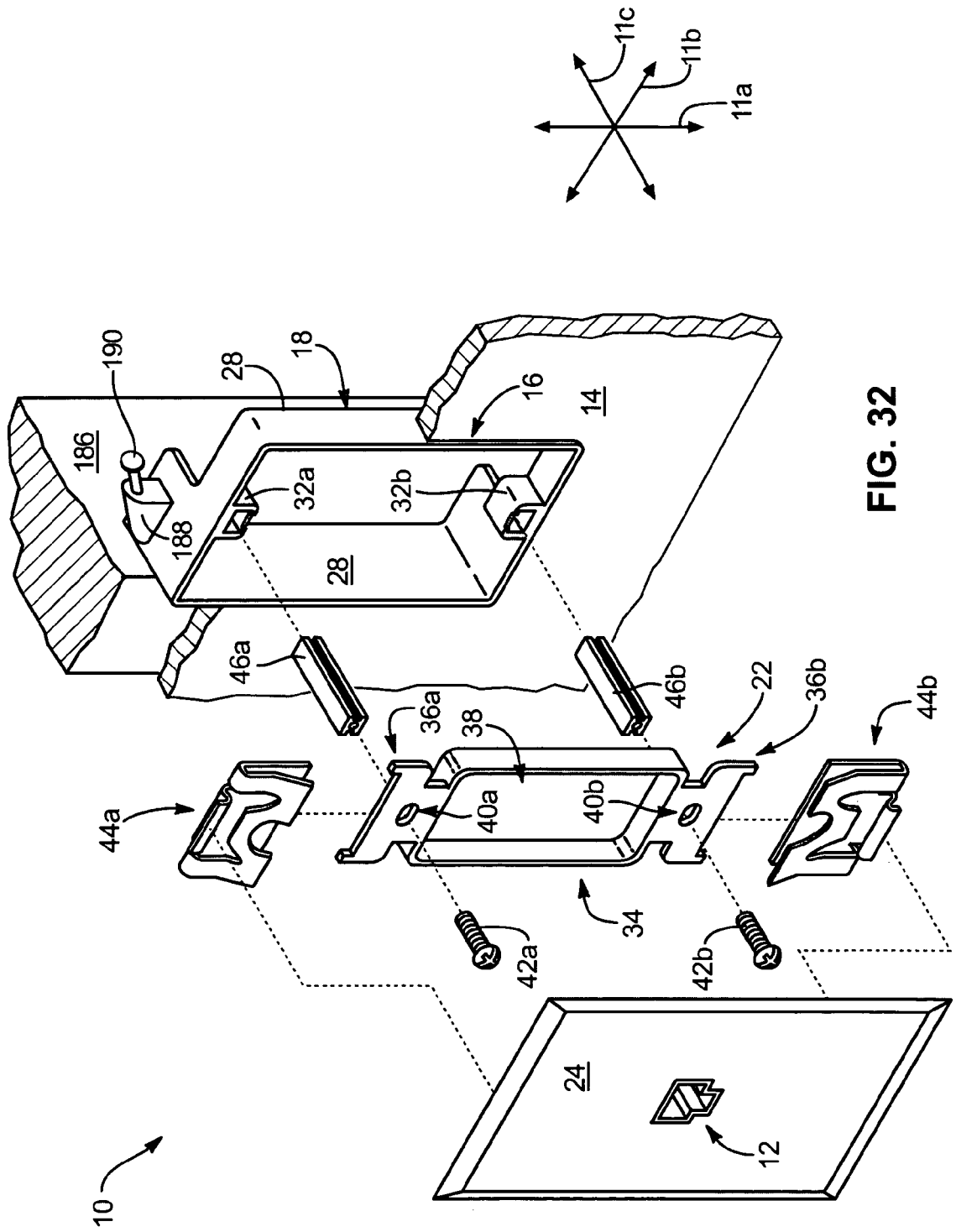
FIG. 32 is an exploded, perspective view of a low voltage terminal assembly in accordance with the present invention arranged to mount to a stud or other support member, rather than to a panel.

Referring to FIG. 32, in certain applications, it may be desirable to provide a low voltage terminal assembly 10 that secures to a stud 186, joist 186, or other support member 186, rather than to a panel 14. Such an embodiment may be used in situations where builders anticipated the placement of a phone jack, network jack, etc. Rather than using a more expensive enclosed connection box, a base 18 having an open back may be secured directly to a support member 186 (e.g. stud 186) before the paneling 14 is applied thereto.

A base 18 in accordance with the present invention may be modified to facilitate securement to a support member 186. For example, in certain embodiments, a base 18 may be formed without a flange 26 to facilitate application of the panel 14 to the support member 186. Moreover, in selected embodiments, an extension 188 may be added to support a nail 190. The extension 188 may hold a nail 190 in a desired orientation while it is driven into the support member 186. If desired, more than one extension 188 and nail 190 combination may be applied to a base 18. Other modifications may be made depending on the nature of the support member 186 to which the base 18 will attach. For example, a base 18 that will be applied to metal stud 186 may be arranged to accept rivets, screws, and the like, rather than nails 190.

The embodiments of devices and systems, as illustrated in the Figures, may be arranged and designed in a wide variety of different configurations that fall within the scope of the present invention. Thus, the description hereinabove is not intended to limit the scope of the possible embodiments, but is merely representative of certain embodiments of devices and systems in accordance with the invention. The information is intended only by way of example and not by way of limitation.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An assembly for securing low voltage terminals, the assembly comprising:
   a panel having an exterior surface, an interior surface, and an aperture extending therethrough;
   a base abutting the exterior surface proximate the aperture, the base including a first receiver; and
   a first securement comprising a retainer and slide, the retainer abutting the interior surface, the slide extending from the retainer, passing through the aperture, and unidirectionally engaging the first receiver to maintain the base in abutment with the exterior surface; and
   the base and first securement further connected to be directly supported exclusively by the panel.

2. The assembly of claim 1, wherein a distance between the retainer and the base is controlled exclusively by linear translation of the slide within the first receiver.

3. The assembly of claim 2, wherein the first receiver includes a barb.

4. The assembly of claim 3, wherein the slide includes a series of teeth formed therealong.

5. The assembly of claim 4, wherein the barb unidirectionally engages the series of teeth permitting the slide to enter the first receiver and resisting removal of the slide from the first receiver.

6. The assembly of claim 5, wherein the series of teeth and barb combine to provide a plurality of securement locations between the slide and the first receiver.

7. The assembly of claim 6, wherein the slide is loaded in tension to grip the panel between the base and the retainer.

8. The assembly of claim 6, wherein the base comprises a flange and an insert, the flange abutting the exterior surface, the insert entering the aperture.

9. The assembly of claim 8, wherein the first receiver is positioned on the insert.

10. The assembly of claim 9, wherein the base is generally rectangular with an open interior and is positioned to frame the aperture.

11. The assembly of claim 9, wherein the base further comprises a second receiver.

12. The assembly of claim 11, further comprising a second securement.

13. The assembly of claim 12, wherein the second securement abuts the interior surface, extends through the aperture, and unidirectionally engages the second receiver.

14. The assembly of claim 13, wherein the second securement and second receiver are mutually ranged to permit insertion of the second securement into the second receiver and to resist removal of the second securement from the second receiver.

15. The assembly of claim 14, wherein the second securement is admitted within the second receiver exclusively by linear translation.

16. The assembly of claim 15, further comprising a face plate connected to the base.

17. The assembly of claim 16, wherein the base farther comprises a third receiver supporting securement of the face plate to the base.

18. The assembly of claim 17, further comprising an anchor connecting the face plate to the base, the third receiver arranged to receive the anchor exclusively by linear translation.

19. The assembly of claim 18, further comprising an interface connecting the face plate to the anchor.

20. The assembly of claim 19, wherein the panel is plaster board forming a wall and presenting the exterior surface.

21. The assembly of claim 1, wherein the base further comprises a second receiver.

22. The assembly of claim 21, further comprising a second securement.

23. The assembly of claim 22, wherein the second securement abuts the interior surface, extends through the aperture, and unidirectionally engages the second receiver.

24. The assembly of claim 21, further comprising a face plate connected to the base, the base further comprising a third receiver supporting securement of the face plate to the base.

25. The assembly of claim 24, further comprising an anchor connecting the face plate to the base, the third receiver arranged to receive the anchor exclusively by linear translation.

26. The assembly of claim 25, further comprising an interface connecting the face plate to the anchor.

27. An assembly for securing low voltage terminals, the assembly comprising:
- a panel forming a wall covering, the panel having a first side, a second side, and an aperture extending therethrough;
- a base abutting the first side proximate the aperture, the base including at least one receiver;
- a least one securement comprising a retainer and slide forming a homogeneously formed unit, the retainer abutting the second side, the slide extending from the retainer, passing through the aperture, and engaging the at least one receiver to maintain the base in abutment with the first side; and
- the base and the at least one securement further connected to be directly supported exclusively by the panel.

28. A low voltage terminal assembly comprising:
- a panel forming a wall covering, the panel having an exterior surface, an interior surface, and an aperture of generally rectangular shape extending therethrough;
- a base abutting the exterior surface and positioned to frame the aperture, the base including at least four receivers;
- at least two securements, each comprising a retainer and slide, the retainer of each of the at least two securement abutting the interior surface, the slide of each of the at least two securement extending from the corresponding retainer, passing through the aperture, and unidirectionally engaging the a receiver of the at least four receivers to maintain the base in abutment with the exterior surface;
- the base and the at least two securements further connected to be directly supported exclusively by the panel; and
- a face plate connected to the base by two fasteners engaging two receivers of the at least four receivers.

* * * * *